US008732024B2

(12) United States Patent  (10) Patent No.: US 8,732,024 B2
Jacobs  (45) Date of Patent: May 20, 2014

(54) SELF-CHECKOUT METHOD AND APPARATUS

(75) Inventor: Eric L. L. Jacobs, Pointe Claire (CA)

(73) Assignee: Fujitsu America, Inc., San Diego, CA (US)

(*) Notice: Subject to any disclaimer, the term of this patent is extended or adjusted under 35 U.S.C. 154(b) by 431 days.

(21) Appl. No.: 12/775,661

(22) Filed: May 7, 2010

(65) Prior Publication Data
US 2012/0265628 A1  Oct. 18, 2012

Related U.S. Application Data

(60) Division of application No. 10/150,146, filed on May 17, 2002, now Pat. No. 7,845,554, which is a continuation-in-part of application No. 09/710,137, filed on Nov. 10, 2000, now Pat. No. 7,168,525.

(60) Provisional application No. 60/244,234, filed on Oct. 30, 2000.

(51) Int. Cl.
G06Q 20/00 (2012.01)
(52) U.S. Cl.
USPC .......................................................... 705/23
(58) Field of Classification Search
USPC ............ 705/15, 16, 22, 26.1, 26.2, 26.62, 23, 705/26; 704/246, 250, 251, 275
See application file for complete search history.

(56) References Cited

U.S. PATENT DOCUMENTS

| 4,908,761 | A  | * | 3/1990  | Tai .............................. 705/14.26 |
| 5,149,211 | A  |   | 9/1992  | Pettigrew et al. |
| 5,426,282 | A  | * | 6/1995  | Humble ......................... 235/383 |
| 5,510,979 | A  |   | 4/1996  | Moderi et al. |
| 5,710,887 | A  | * | 1/1998  | Chelliah et al. ............. 705/26.62 |
| 5,839,104 | A  |   | 11/1998 | Wahome, Jr. et al. |
| 5,987,428 | A  | * | 11/1999 | Walter ............................ 705/23 |
| 5,991,740 | A  | * | 11/1999 | Messer ....................... 705/14.29 |
| 6,497,362 | B2 | * | 12/2002 | Persky et al. .................. 235/383 |
| 6,676,016 | B1 | * | 1/2004  | Coskrey, IV .................. 235/380 |
| 6,845,910 | B2 | * | 1/2005  | Gu et al. ........................ 235/454 |
| 7,063,263 | B2 | * | 6/2006  | Swartz et al. ............. 235/472.02 |
| 7,168,617 | B2 | * | 1/2007  | Walker et al. ................. 235/383 |
| 7,319,990 | B1 | * | 1/2008  | Henty ........................... 705/400 |
| 7,545,816 | B1 | * | 6/2009  | Coutts et al. .................. 370/400 |
| 2002/0152123 | A1 |   | 10/2002 | Giordano et al. |

FOREIGN PATENT DOCUMENTS

| EP | 0446500 |    | 9/1991 |
| EP | 0817141 | A2 | 1/1998 |
| EP | 1061485 | A1 | 12/2000 |
| WO | 0237432 | A2 | 5/2002 |

* cited by examiner

Primary Examiner — Andrew Joseph Rudy
(74) Attorney, Agent, or Firm — Victor Siber

(57) ABSTRACT

A point-of-sale self-checkout terminal includes a code reader device for automated entry of a product identification code present on items for purchase and a customer input device for receipt of data from a customer. A customer can initiate a purchase of a non-scannable item and, in response, a database is queried to identify items based on a prediction of purchase of the items, and the identified items are displayed for selection by the customer to purchase the item. Image processing and voice processing, can also be implemented to assist customers with the purchase of non-scannable items.

9 Claims, 21 Drawing Sheets

SELF-CHECKOUT METHOD AND APPARATUS

CROSS REFERENCE TO RELATED APPLICATION

The present application is a divisional of non-provisional Ser. No. 10/150,146, filed May 17, 2002, now U.S. Pat. No. 7,845,554 now published, which is a continuation-in-part of Ser. No. 09/710,137, filed Nov. 10, 2000, now U.S. Pat. No. 7,168,525 the disclosure of which is hereby incorporated by reference in its entirety, claiming the benefit of provisional application 60/244,234 filed Oct. 30, 2000.

FIELD OF THE INVENTION

The present invention relates to a method and apparatus for self-checkout. In particular, the invention relates to a method of and apparatus for self-checkout of non-bar coded items which includes using a graphic user interface (GUI) on a touch screen display.

BACKGROUND OF THE INVENTION

In a traditional retail environment, a customer selects various items for purchase and brings these items to a store clerk for checkout. Over the past few decades, retail point of sale systems have been greatly automated to expedite the checkout process. Computer-based point-of-sale systems are now the norm in the retail environment.

Such point-of-sale systems include one or more terminals, and a database of prices, inventory and other information related to the items for purchase. Each terminal typically has an optical scanner which scans the items to be purchased for a machine readable bar code that identifies the item on its packaging. When an item is scanned, the optical scanner sends a signal corresponding to the product number of the item to a data processing component of the point-of-sale system, which then obtains from the database the price and the description of the scanned item.

More recently, self-checkout point-of-sale systems have been popularized. These systems typically comprise self-checkout terminals each of which typically is provided with a bar code scanner with an integrated scale that allows the customer to scan the bar codes on the items to be purchased. The terminal typically also has other input and output devices such as a printer, electronic fund transfer terminal (EFT), a video camera unit and a display.

Automated self-checkout systems, such as the U-Scan Express® available from Optimal Robotics Corp., have become popular among retailers throughout North America. Some self-checkout systems are described in U.S. Pat. Nos. 5,083,638, 5,115,888, 5,123,494, 5,125,465 and 5,168,961.

In the typical retail market, most produce items, as well as other items such as items priced according to weight but usually not having a standardized weight, do not have a Universal Product Code (UPC), in the form of a bar code, associated with them. A Product Look Up (PLU) code is assigned instead to such items. The PLU code corresponds to a numeric identification of the item and, in most cases, is attached to the item with a sticker.

The non-bar coded item typically is checked out by the item being placed on the scale at the checkout station, if the item is priced according to weight, and then the PLU code of the item being entered by the customer at the self-checkout station, or by the cashier at a manned checkout station, using the numeric keypad. The processing unit then assigns a price to the item based on the PLU code and, if applicable, the weight of the item detected by the scale. Many customers at such self-checkout stations do not know, however, that they need to enter manually the PLU code for such items, and therefore such customers experience delay in the checkout process.

At a self-checkout terminal, the customer is provided means to call for assistance from a supervisory employee when a non-bar coded item is to be processed. In some implementations, a video camera unit at the self-checkout terminal captures a video image of the uncoded item placed on the terminal's scale by the customer. The video image of the uncoded item is displayed at a supervisor station display which allows the supervisory employee to view the non-bar coded item and thereafter enter the appropriate PLU code for the item. This employee typically supervises, however, several self-checkout terminals, and therefore the customer might encounter delay waiting for a non-bar coded item to be processed.

SUMMARY OF THE INVENTION

The present invention provides an apparatus and method for self-checkout of non-bar coded items. The apparatus includes a PLU entry device, a PLU database and a NYB processing unit. The PLU entry device includes a display and a GUI. The GUI provides on the display a predetermined image corresponding to a non-bar coded item, and means for the user to select the predetermined image of the non-bar coded item. The PLU entry device supplies a PLU corresponding to the non-bar coded item selected by the user. The processing unit uses the PLU supplied by the PLU entry device to retrieve the price per pound or per unit of the selected non-bar coded item from the PLU database. This data can be used to calculate price in relation to the weight or quantity of the item.

The apparatus may include a GUI editor. The GUI editor may be used to configure the GUI for non-bar coded items.

The processing unit may maintain for each item a count of the number of units of the item sold within a predetermined period of time. The processing unit also may maintain a list of most frequently sold items, and the image of at least one item on the list may be provided on a selected display screen. The processing unit may update the display screen when the list of most frequently sold items changes. Using a statistical prediction algorithm, the processing unit may also suggest to the user to purchase certain items that are commonly purchased with the items that the user has already decided to purchase. The statistical prediction algorithm may use various data, including, but not limited to, the characteristics associated with the purchased item.

An image of a generic category of items may be provided on the display. The displayed image of the generic category may be selected by the user to view images of respective items in the generic category.

BRIEF DESCRIPTION OF THE DRAWINGS

The present invention can be more readily understood from the following detailed description by referring to the accompanying drawings wherein.

DETAILED DESCRIPTION OF THE INVENTION

Improvements in the operation and usability of point-of-sale self-checkout systems can be provided by a self-checkout system that includes a scanning device for automated scanning of bar-coded items as well as a customer-operated interface for checkout of items that are not coded for scanning. The customer-operated interface can be a graphical user interface (GUI) (a "non-scannable item GUI") that may include features such as a touch-screen display and input device, iconic representations of items for purchase, and search facilities to help identify items being purchased and to enter appropriate checkout data. An editor for provisioning data and setting up various features of the non-scannable item interface can also be provided. The checkout system, and in particular, the non-scannable item GUI, can be used for checkout of items such as produce and bakery items in a grocery sales environment and for non-scannable items in other retail environments. To do so, a flexible method of provisioning data and icon images associated with the non-scannable items is provided.

Figure 30:
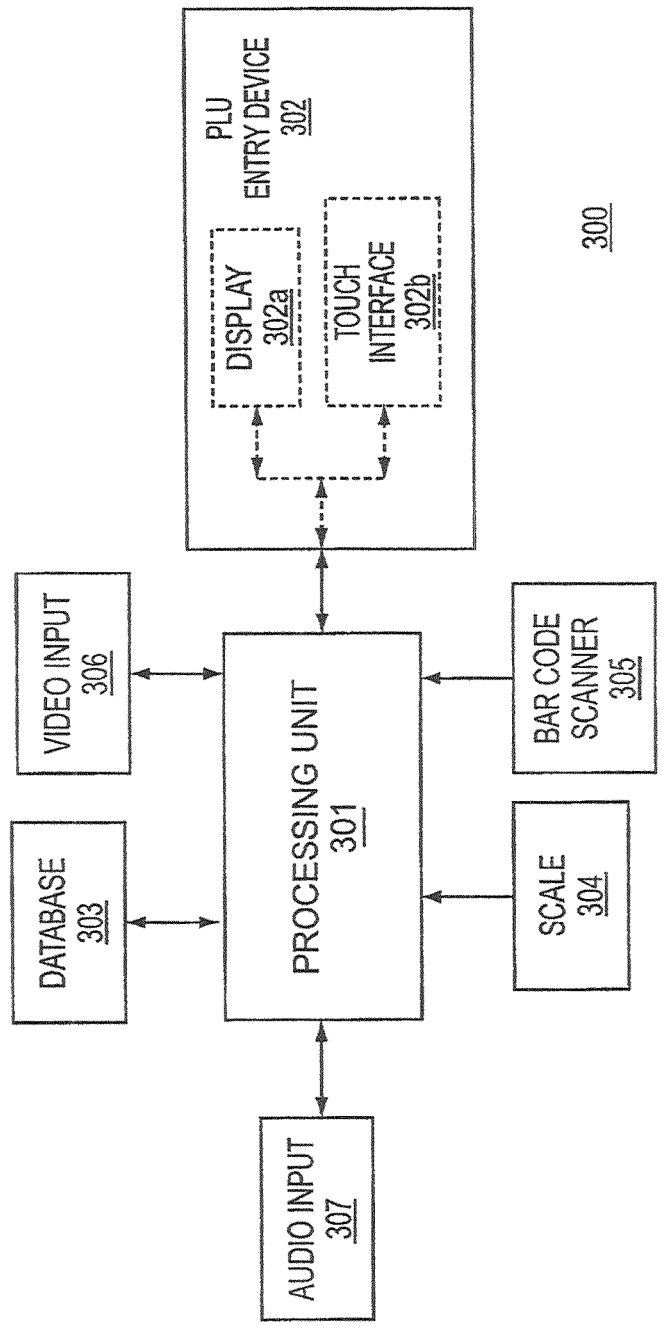
FIG. 30 shows a block diagram of a self-checkout system.
Figure 31:
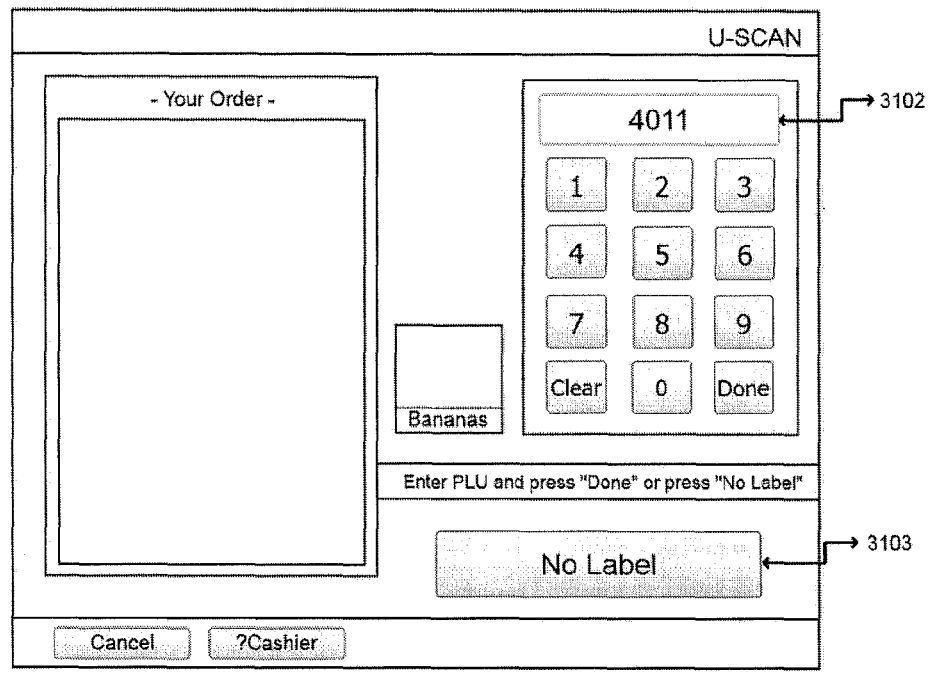
FIGS. 31-35 show exemplary screens of the GUI for non-bar coded items with alphanumeric lookup.

FIG. 30 shows a block diagram of an implementation of a point-of-sale self-checkout station that includes a non-scannable item GUI. The self-checkout station 300 includes a processing unit 301 which may be configured similar to known microprocessor-based computers and has a central processing unit (CPU), a plurality of storage devices, an input/output (I/O) interface and a network interface. The storage devices may include program memory, random access memory (RAM), non-volatile memory, read-only memory (ROM), electrically erasable programmable ROM (EEPROM), etc., and any or a combination of the mass storage devices known conventionally in the art, such as floppy disk, optical disk, hard disk and/or tape cartridge drives, plus appropriate device drivers. The CPU communicates via the I/O interface with a PLU database 303, one or more scales 304, a touch-screen display 302 (or other entry device, such as a touchpad), and a bar code scanner Items may include other types of machine-detectable identification encodings instead of, or in addition to, scannable bar codes (e.g., magnetic encodings, magnetic transducers, and other machine-readable printed codes). Consequently, implementations may be equipped with other types of reader devices to detect encoded product identifications (IDs), e.g., magnetic sensors to read magnetic encodings, and other types of scanning sensors for other printed code types.

The self-checkout station (i.e., processing unit 301) also can include a network interface used for communication over a network (e.g., a local area network, wide area network (WAN), wireless and other networks) with other devices. These other devices may include a host computer, such as a store's central controller, and may also include other checkout stations and supervisory stations. The network interface includes the appropriate units for interfacing with the network, including, for example, Ethernet card, modem, radio frequency (RF) transceiver, etc. For example, processing unit 301 may download product and other information from a central point-of-sale database on the network, on power-up as well as periodically during operation, via the network interface. Thus, the PLU database 303 stored in the storage devices may be updated.

Self-checkout orders commonly include a combination of scannable (i.e., bar-coded) and non-scannable items. To purchase a scannable item, the customer moves the item past an automated scanning device which reads the scannable product identifier and thereby determines the item's identification. If the customer wants to purchase a non-scannable item, the customer may do so by entering of a product identifier using the non-scannable item interface. This product identifier can be received through the entry of an alpha-numeric identifier, an icon selection, or by a combination of these methods (the chosen mechanisms may differ in different implementations).

In some implementations, speech and visual inputs may be processed by the self-checkout system to assist in identifying a produce.

FIGS. 1-2 and 31-35 show customer interface screens displayed in two example implementations (implementation #1 and #2) of non-scannable item GUIs. Each of the example implementations uses an interactive touch-screen display 302 combining a touch-sensor screen 302b and a cathode ray tube (CRT), liquid crystal display (LCD), or other graphical display element 302a for customer interaction. Implementation #1 (FIGS. 1-2) includes a on-screen numeric keypad 192 for the entry of product lookup (PLU) codes, and displays interactive icons 191 that can be used to select an item from system determined initial grouping of products. The system-determined grouping is a grouping that is determined separate from an explicit search request by a customer for a desired item. Examples of system-determined groupings include predetermined grouping and predicatively determined grouping (e.g., a grouping of frequently-purchased non-scannable items). Implementation #2 (FIGS. 31-35) also includes a on-screen numeric keypad 3102, as well as a system-determined initial group of interactive icons 3201. Implementation #2 also includes a alphabetic keyboard interface 3204 used to enter search terms so that the customer can locate and select products in addition to those shown in the initial group 3201. The self-checkout system's non-scannable item GUI is accessed when the customer wishes to purchase a non-barcoded item. Access to the interface may be triggered when the customer places an unscanned item on a scanner scale, or by explicit selection of a on-screen control from the display 302 (e.g., a button labeled "Purchase Item Without A Bar Code).

Figure 32:
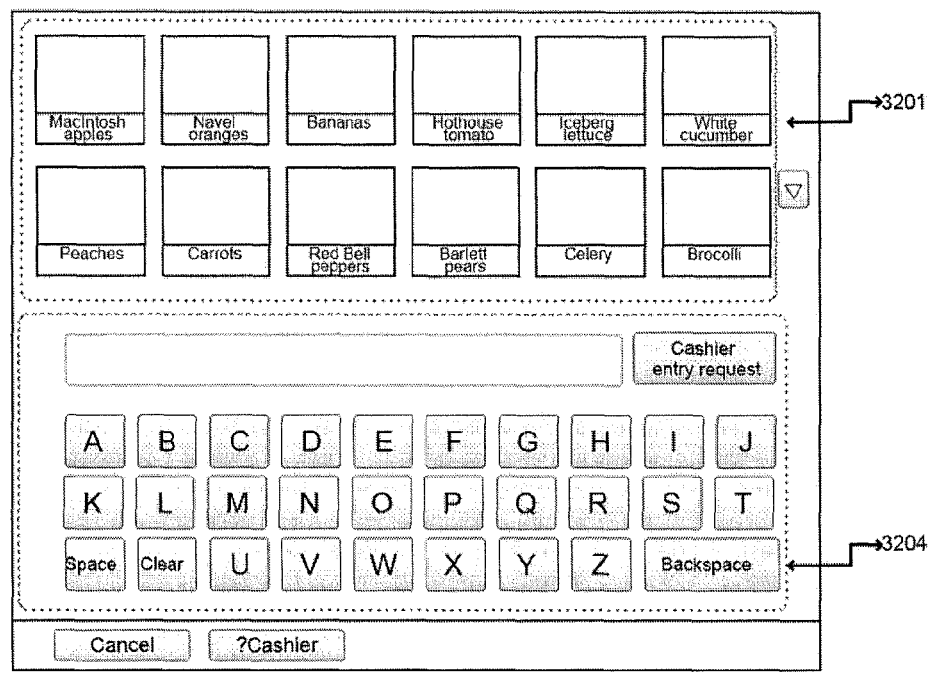

When the non-scannable item GUI is activated, a PLU entry screen 100, 3100 may be displayed. As shown in screen 100 of implementation #1, the customer can identify an item by PLU code entry using a graphical touch-screen keypad 192. If the item is displayed in the grouping 191, the customer can also select the appropriate item to enter the purchase. In some implementations, icons 191 display images representing a generic category and selection of the generic category's icon will provide a more detailed sub-menu. If the item is not labeled with a PLU code, and an appropriate icon 191 is not displayed, the user may select the "No Label" button 103 to obtain assistance from store personnel. Interface screen 3100 of implementation #2 also permits entry of a PLU code using a graphical touch-screen interface. If the item is not labeled with a PLU code, the user can select the "No Label" button 3103 to access a second interface screen 3200 (FIG. 32). Interface screen 3200 initially displays the system-determined icon grouping 3201 as well as an on-screen keyboard 3202. Icons initially displayed in 3201 can be best seller or most frequently sold items, and this information can be displayed as soon as the screen is displayed. If the purchase item is shown by an icon 3201, the user may select that icon to purchase the item, otherwise keyboard 3204 may be used to enter terms used to search a product database 303 and locate the desired item.

Figure 33:
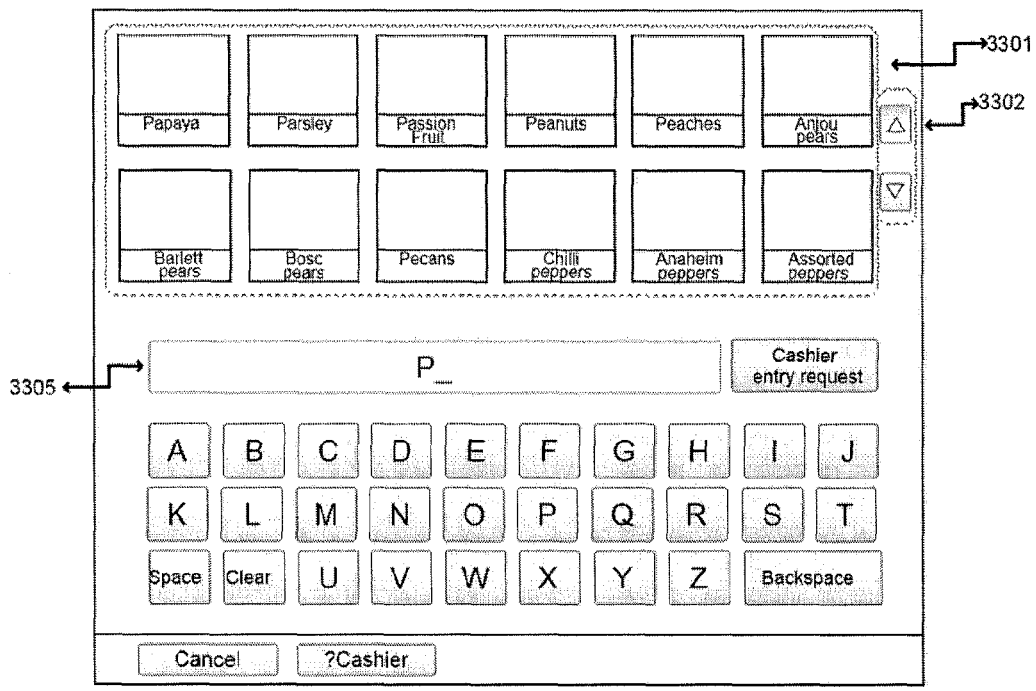
Figure 34:
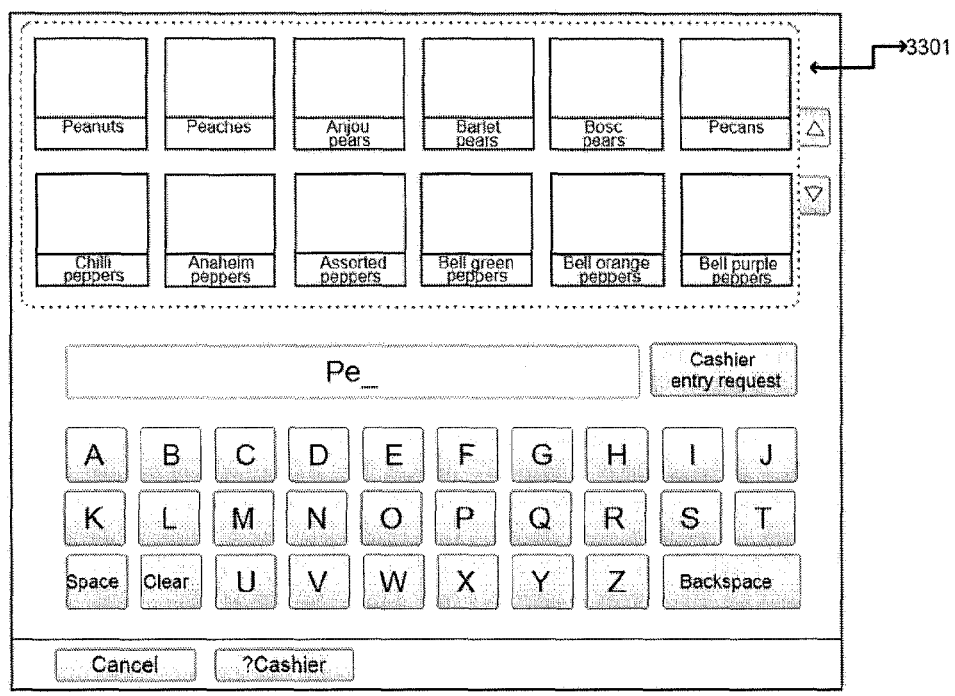
Figure 35:
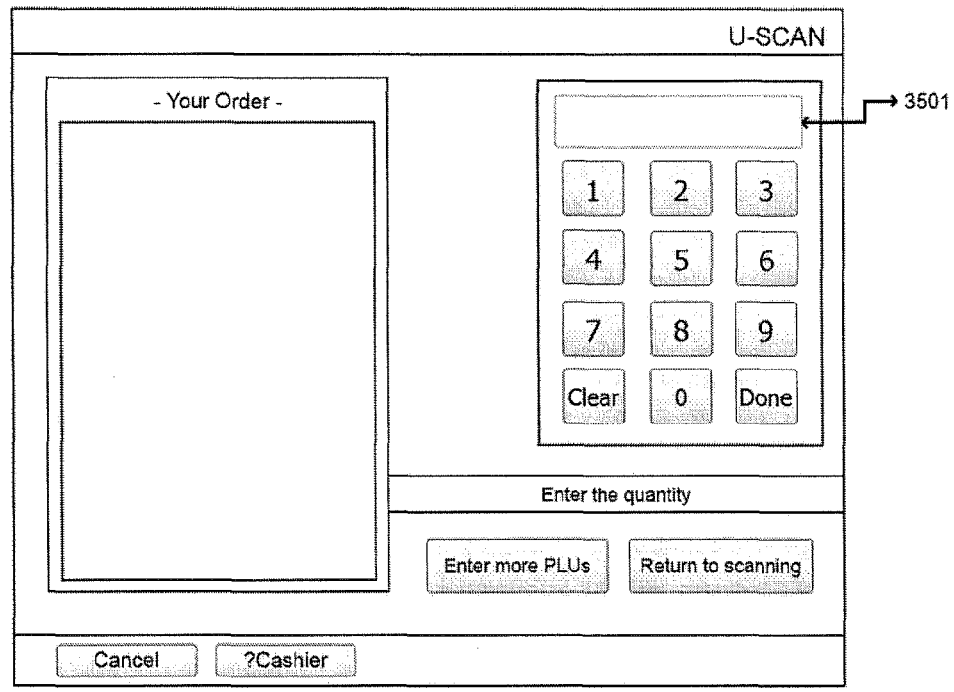

To locate a desired item, keyboard 3204 is used to provide alphabetic character input (or, in some implementations, expanded input sets such as alpha-numeric) to the checkout system. The checkout system receives the input characters, parses the input into search terms, queries a product database, and display results as user-selectable icons. Referring to FIG. 33, as letters are entered on the keyboard 3204, they are displayed in a display area 3305 and matching products are determined based on the entered characters and displayed as icons 3301 displayed on the interface 3300. As additional letters are entered, the display area 3301 is again updated to reflect the additional input (compare the icons of FIG. 33 which are displayed after the entry of the letter "P" with the icons of FIG. 34 which are displayed after the further entry of the letter "E").

Figure 36:
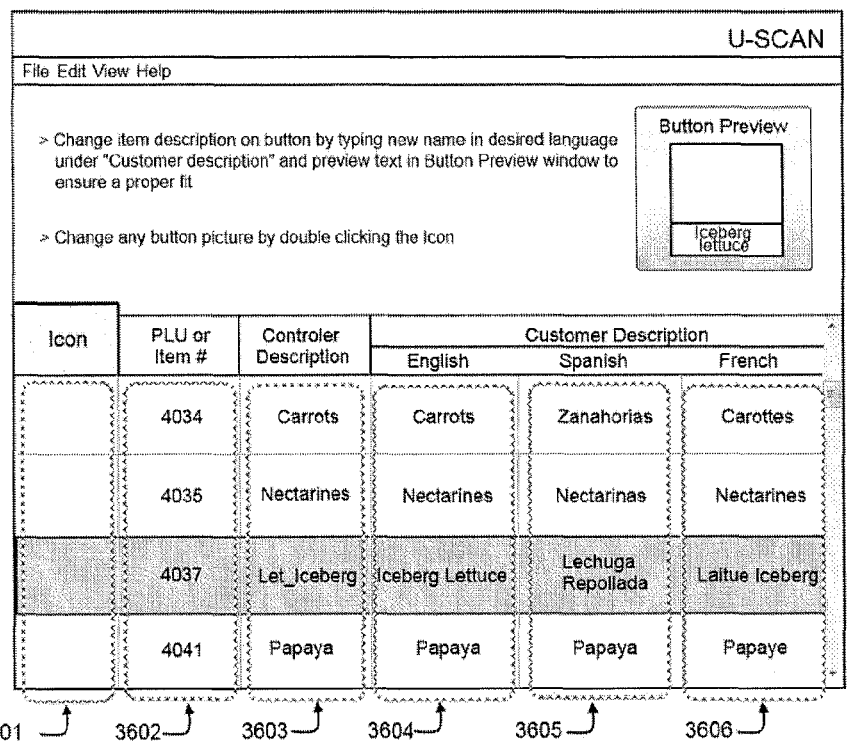
FIG. 36 shows data stored in exemplary database records.

To identify the matching products, the checkout system parses input characters to form search terms and uses those terms to query the database 303 and thereby locate matching items. The search terms included in the query can include words (i.e., a group of contiguous letters delimited by a space character) as well as a word fragment (i.e., a group of contiguous letters not yet delimited by a space character). Querying database 303 includes comparing each of the search terms to keywords associated with each product. The item-keyword database may be stored in a local database 303 or a central database (e.g., a store controller database). FIG. 36 shows example item-keyword records for a number of products. As shown in FIG. 36, for each product, the database stores an icon 3601, a PLU number 3602, a descriptors 3603 that may be used by other store systems (e.g., by a store's master controller), and keywords in one or more languages (e.g., English 3604, Spanish 3605, and French 3606).

Preferably, the product query algorithm will match search terms to an item's keywords regardless of the relative ordering of the search terms and keywords. Further, a search term will match a keyword if the term is present as an initial substring of the keyword. Thus, the term "Pear Bos" will match "Bose Pears." Additionally, implementations may provide for automatic conversion between plural and singular terms such that a term entered by the user in the plural (e.g., "pears") will match a keyword expressed in the singular (e.g., "pear"). Conversion between singular and plural tenses may be done, e.g., by using a lookup table. In some implementations, a lookup table may also be used to convert a term entered by a user into an alternative term or to expand an entered term into multiple terms. This conversion and expansion feature may be used, for example, to convert a regional product name to a standard term, or where a product may be known by multiple terms (e.g., in a hardware store implementation, the search term "fastener" may be expanded to the Boolean search expression "bolt or screw or rivet"). Where term substitution and/or expansion is employed, the display of results may be in accordance with an ordering that favors results matching the specific terms entered, rather than the expanded or substitute terms. Furthermore, in some implementations, the processing unit may use a statistical prediction algorithm to suggest to the user to purchase certain items that are commonly purchased with the items that the user has already decided to purchase. The statistical prediction algorithm may use various data, including, but not limited to, the characteristics associated with the purchased item.

In some implementations, the icon display 3301 is automatically updated as each letter is entered. In other implementations, the icon display may be updated when there is a pause in data entry (e.g., after a 500 millisecond pause), or upon explicit request by the user (e.g., selecting an "Enter" button). Implementations can also include scroll buttons (e.g., buttons 3302) used to scroll the displayed icons when the number of items exceeds the available screen space. After the desired item icon is displayed and selected, another screen (FIG. 35) may be displayed for the entry of quantity information using keypad 3501.

In the example implementations (#1 and #2), the system-determined icons (191 30 and 3201, respectively) are displayed when the non-scannable item GUI is accessed. These initial icons sets 191, 3201 may be selected based on an expectation or probability that a particular items is to be purchased. This expectation can be determined based on the frequency of purchase of particular items during a preceding period (e.g., during the past month) in all customer orders. In other implementations, the initial icons 191, 3201 may be customer specific and can be determined based on a customer's specific sales history. The initial icon set can also be determined based on other statistical/probabilistic factors. For example, the icons 191, 3201 may be determined based on a statistical correlation that a particular item will be purchased when another item has already been entered as part of an order. For example, in a hardware store implementation, if copper piping has already been entered in an order, the icons 191, 10 3201 may correspond to non-bar-coded joints and fasteners used to connect copper piping.

In some implementations, the system-determined icons 191, 3201 can be determined on a user-specific basis. To enable this feature, the database 303 includes customer purchase history information. Following receipt of a customer identification by the self-checkout system (e.g., by the swiping of a bar-coded frequent-shopper card in front of a scanner, swiping of a credit or debit card entry, or using data entered directly by the customer), the database 303 is queried to determine the user's purchase history. The icons 191, 3201 are then determined based on the user's purchase history or other user-specific information. Correspondingly, at the end of order processing, customer purchase data may be stored in the database 303 reflecting the newly purchased items. In other implementations, the sales history database may be implemented by data stored on the frequent-shopper card (e.g., using a magnetic strip or in "smart card" memory).

Implementations can include further refinements, such as the ability to determine the frequently sold items on a seasonal basis. In such implementations, the database 303 can store customer purchase information along with purchase dates so that seasonal buying patterns can be determined. Thus, for example, during the week before Halloween, icons for purchase of pumpkins may be displayed based on a customers' purchases of pumpkins during that week of the previous year. This information may be stored without differentiating based on the particular customers, or may be stored on a customer-specific basis.

The icon grouping 191, 3201 may change continuously as a result of ongoing sales at the self-checkout terminals. For example, in a frequently-sold item implementation, the system automatically updates the images on the touch screen monitor for those buttons pre-defined as buttons for most frequently sold items. The updating of the buttons may be dynamic and may occur in between the processing of two orders at the self-checkout terminal, or may be at greater intervals (e.g., monthly or quarterly). The processing unit of each self-checkout terminal, or a central database, may maintain an item count of every produce (or non-bar coded item) sold. Checkout terminals may communicate to find the highest count of produce (or non-bar coded) items in their database.

As an example, the following may be a snapshot (in time) of information stored in the databases corresponding to counts of produce (or non-bar coded) items sold at four respective self-checkout terminals in a grocery store:

| Terminal 1 Database | Terminal 2 Database | Terminal 193 Database | Terminal 4 Database |
|---|---|---|---|
| carrots = 156 | lemons = 200 | bananas = 750 | cucumbers = 6 |
| peaches = 48 | tomatoes = 156 | carrots = 155 | bananas = 46 |

After the terminals have communicated amongst themselves, (or the purchase information has been aggregated in a central data system) the following results may be displayed on the touch screen monitor of each of the self-checkout terminals:

Top 1 = bananas
Top 2 = carrots
Top 3 = lemons
Top 4 = tomatoes
Top 5 = peaches
Top 6 = cucumbers Each database record may also contain other information such as an expected weight range, density range, and size information. This additional data may be employed in enhanced versions of a self-checkout system. Two such enhancements include the use of image processing and voice recognition.

In an implementation that includes image processing, the system-selected items 191, 3201 may be selected based on analysis of an image of an item as captured by a video camera 306. This image data may include the color, shape, size, texture, and number of items. For example, the camera 306 may capture an image of one or more pieces of fruit placed on the scale 304, process the image to determine candidate items, and display those items on the non-scannable item interface. Technology for the recognition of visual images is known (see, for example, U.S. Pat. No. 5,546,475; U.S. Pat. No. 5,631,976; U.S. Pat. No. 5,649,070; U.S. Pat. No. 6,005,959; and U.S. Pat. No. 6,310,964 specifically addressing the recognition of images of produce). By applying such recognition system technology to the selection of a group of candidate items, rather than merely for the final determination of the product, the system 300 may provide for additional accuracy by including confirmation by the customer of the image processing results.

In some implementations of the system 300, criteria such as weight (as determined by the scale 304) and size or shape (as determined by image processing) can be used together. For example, size, shape, and weight can be used to calculate item density. This size, shape, weight, texture, color, and/or density information can be compared to data stored in the database 303 to further refine the selection of icons 191, 3201. For example, image processing may be used to determine that an item placed on the scale 304 is a spherical item. Therefore, the system will only select items from database 303 where the database 303 indicates that the items are spherical. In some cases, weight may be used to further distinguish item. For example, a melon and a head of iceberg lettuce may each have similar spherical shapes and sizes. However, at a given size, the weight of these two items, and therefore their density, will occupy different ranges and this data can be used as distinguishing criteria. Once the CPU has made the item analysis, it will display a suggestion of photo quality images of the non-bar coded items on the self-checkout terminal's touch screen monitor 191, 3201. Of course, if the image analysis does not yield a appropriate result, the customer may identify the item using the keyboard 3204 search method or PLU entry methods described of the system 300.

In some implementations, the image processing features may be used for security purposes instead of, or in addition to, the use of image processing for item selection. For example, the system may capture an image of a produce item, process that image to make an initial assessment of the item, and compare it to an item selection entered by the consumer using the non-scannable item interface. If the item selected by the consumer matches the recognition system's identification of the item, the purchase is made. If there is a mismatch, an alert may be sent to a monitoring station displaying the image captured by the system as well as the identification entered by the consumer. The attendant at the monitoring station may then approve the transaction (e.g., where the consumer entered the proper identification but the recognition system assessment was inaccurate), or override the consumer's item identification by accepting the recognition system's assessment or by entering a correct item identification.

In some implementations, the system may be equipped with a voice recognition system that can operate to identify non-scannable items. When a non-scannable item needs to be identified, the user may have an option of speaking into a microphone 307 to identify the item. The system can be programmed to recognize both specific and generic descriptions of each item (e.g., "Apple" or "Granny Smith"). If a generic identifier is specified, then the system may display icons corresponding to the specific choices within the generic category. Preferably, speaker-independent voice recognition software will be used to implement voice recognition capabilities. Further, the system may be programmed to identify multiple languages.

An editor for setting up the non-bar coded items GUI, in accordance with one embodiment of the present invention, will be described below in connection with FIGS. 3-26 and 29.

A GUI editor may be provided as a tool for an administrator of the self-checkout system to set up the GUI for non-bar coded items. The term "administrator" is used herein to mean a person who has access privileges for configuring the GUI for non-bar coded items. Such person need not be a computer specialist or expert, particularly when the person has the benefit of a GUI editor such as the one described below.

Figure 1:
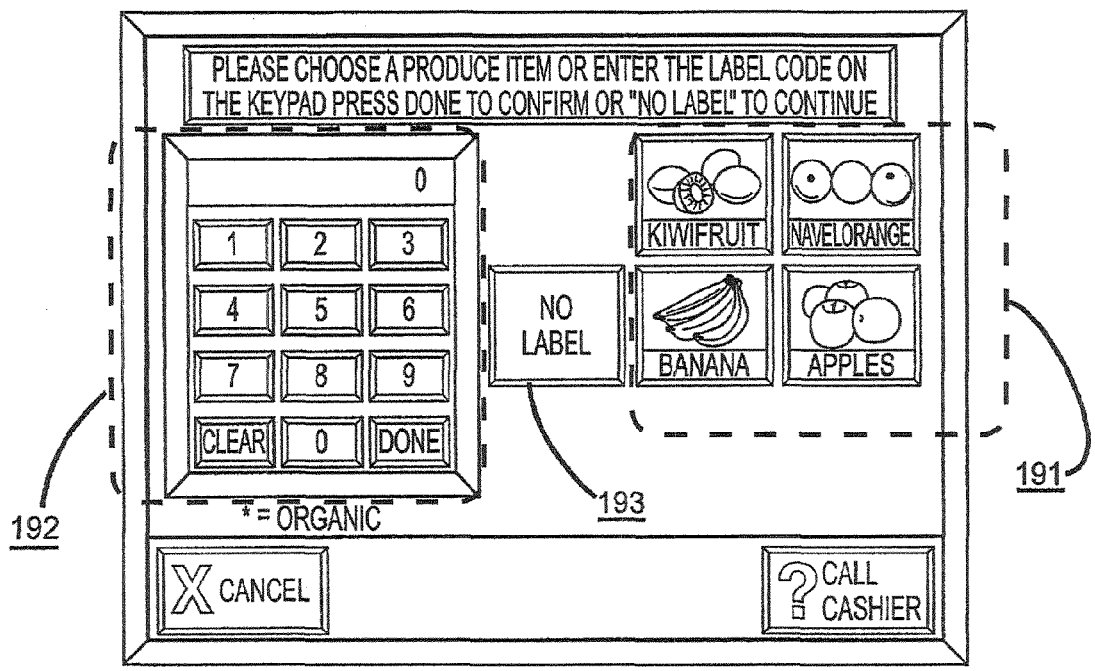
FIG. 1 shows an exemplary image of a non-bar coded item selection GUI that can appear on a touch screen monitor for selecting a generic category of items.
Figure 2:
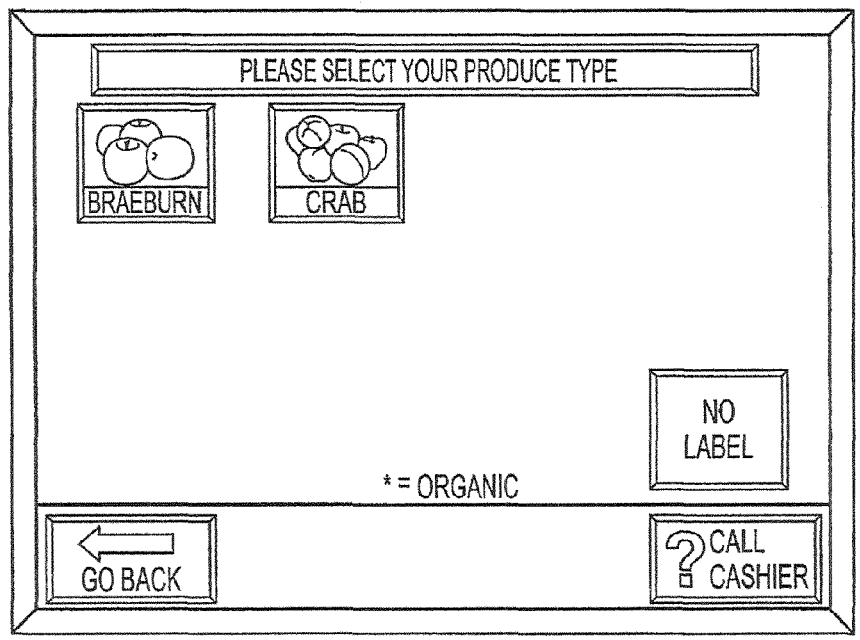
FIG. 2 shows an exemplary GUI screen for selecting one of specific types of apples.

Using the GUI editor, the administrator may select, and configure the terminals to show, the appropriate GM screens, such as those illustrated in FIGS. 1 and 2, for non-bar coded items.

Configuration of the GUI for non-bar coded items may be performed at, for example, one of the self-checkout terminals in a maintenance mode. The maintenance mode screens at the self-checkout terminal allow the administrator to use a GUI editor for setting up the screens for processing non-bar coded items. After configuration of the GUI for non-bar coded items has been completed at the selected terminal, the GUI data may be broadcast to the remaining self-checkout terminals in the store on a LAN or wireless network, in order for the GUI for non-bar coded items to be installed on those terminals.

The selected checkout terminal on which the GUI for non-bar coded items will be configured enters a maintenance mode from one of a number of possible paths. For example, the terminal may enter the maintenance mode by default upon boot-up or by command from a shell or user interface.

Figure 3:
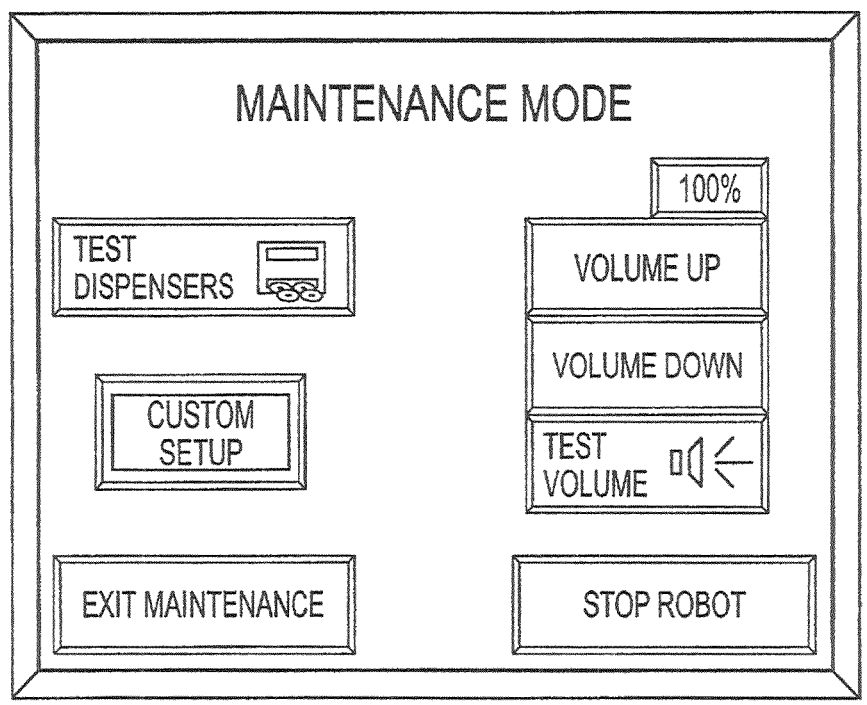
FIG. 3 shows an exemplary GUI screen presenting maintenance mode options.

An example of a GUI screen which may be displayed when the terminal enters the maintenance mode is illustrated in FIG. 3. The maintenance mode screen provides assorted user interface features for performing maintenance at the terminal, including testing the various components of the terminal, such as the bill dispenser and the speaker. Moreover, the administrator is provided with means, e.g., a graphic button/key, to enter custom setup of the terminal (step 102 shown in FIG. 29)

Figure 4:
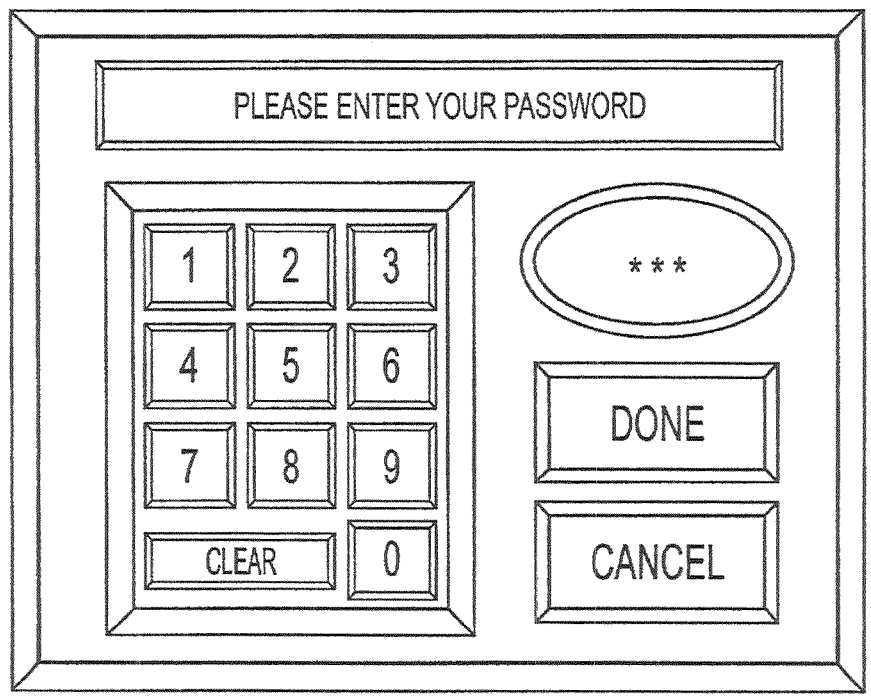
FIG. 4 shows an exemplary GUI screen for entering a password.
Figure 5:
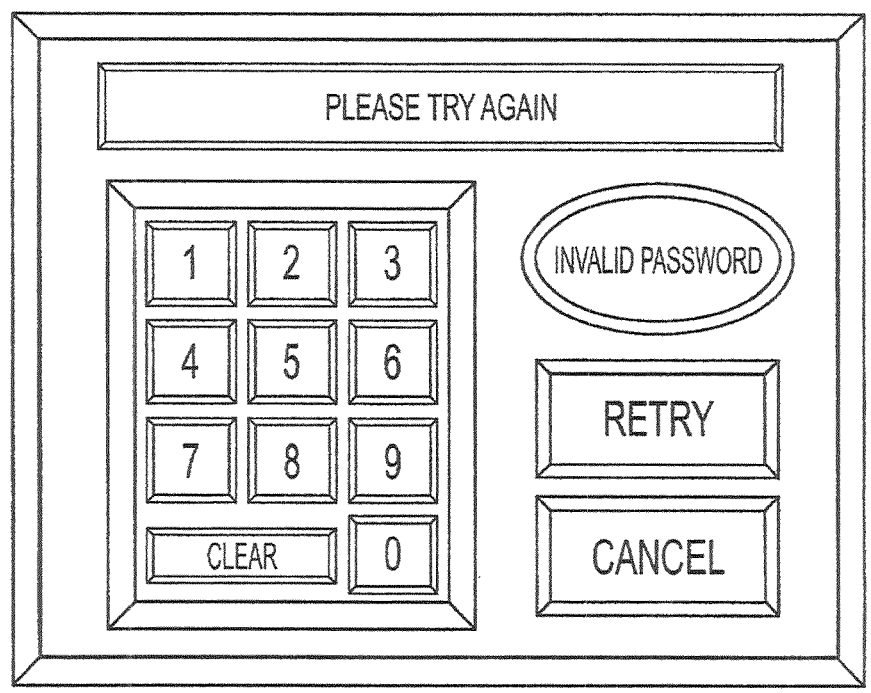
FIG. 5 shows an exemplary GUI screen for entering an alternate password.
Figure 6:
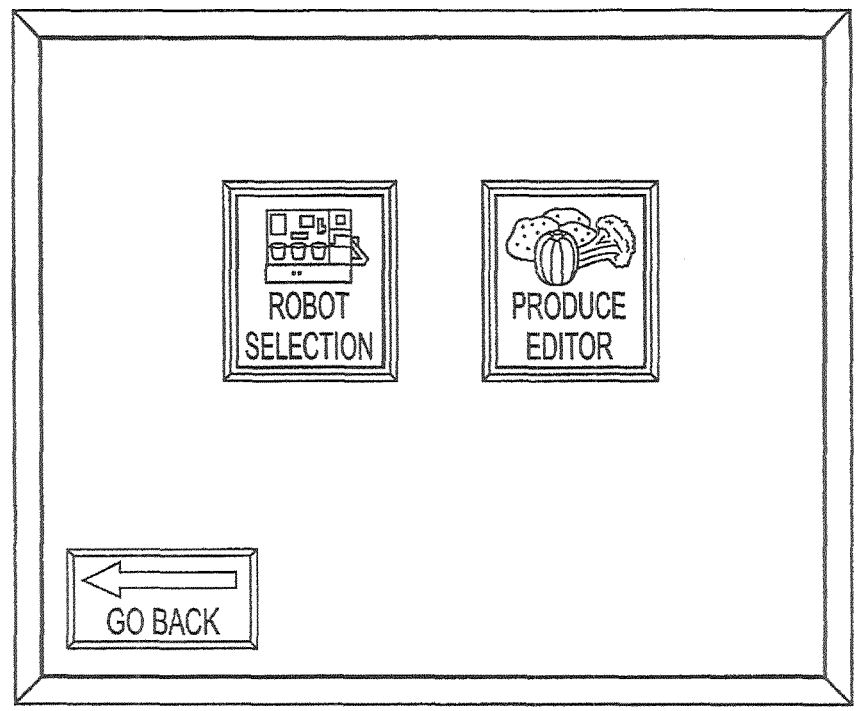
FIG. 6 shows an exemplary GUI screen presenting custom setup options.

Custom setup is password protected, i.e., the user is required to enter a password to enter custom setup. An example of a GUI screen for entering custom setup is illustrated in FIG. 4. The user may enter the password and select a "DONE" button on the touch screen monitor (step 104). If the password is incorrect (step 106), a message asking the user to try again may appear on the screen, as shown for example in FIG. 5.

When the password is correct, the administrator is provided with a number of custom setup functions by the GUI. The user interface provides means on the touch screen monitor, e.g., button identified as "Produce Editor" in FIG. 6, for the user to select access to the GUI editor for non-bar coded items (step 108). An additional password also may be required for access to the GUI editor. The GUI again may prompt the user for a password as shown for example in FIG. 4 (step 110).

Figure 7:
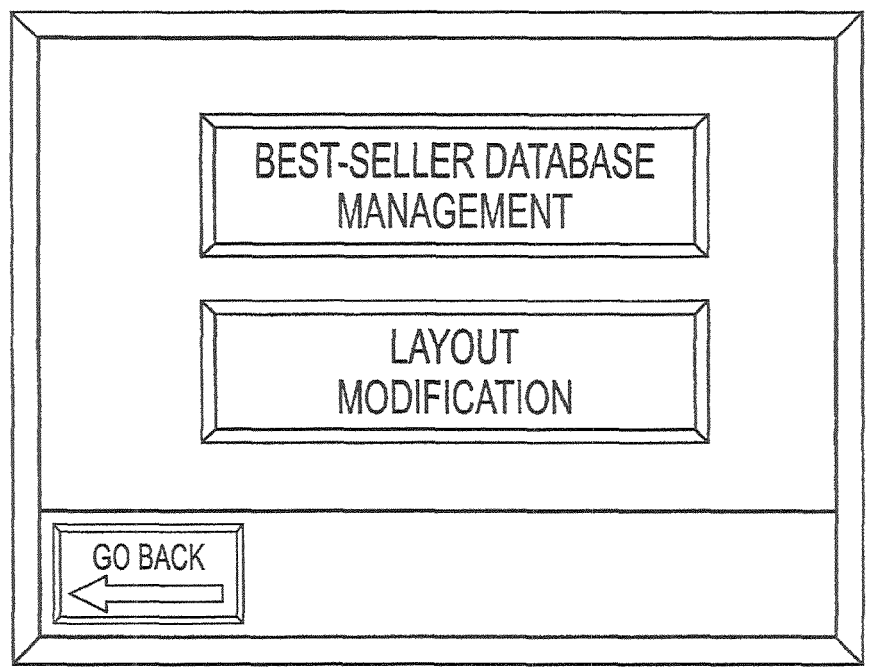
FIG. 7 shows an exemplary GUI editor screen presenting edit options.

After a correct password is supplied (step 112), the GUI editor provides the 30 administrator with two edit options (step 114), as shown for example in FIG. 7. The administrator may select the first option (shown in FIG. 7 as "Best-Seller Database Management") to configure a database of specific features, such as the best seller items, described further below. The administrator may select the second option (shown in FIG. 7 as "Layout Modification") to configure a layout of the GUI for non-bar coded items.

Figure 8:
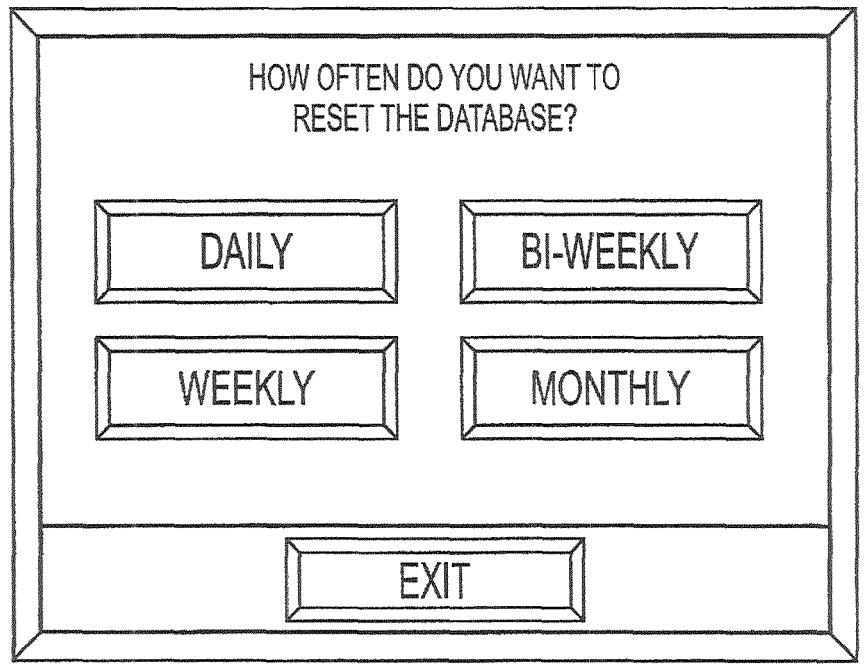
FIG. 8 shows an exemplary GUI editor screen for selecting a reset frequency for the database of most frequently sold items.
Figure 9:
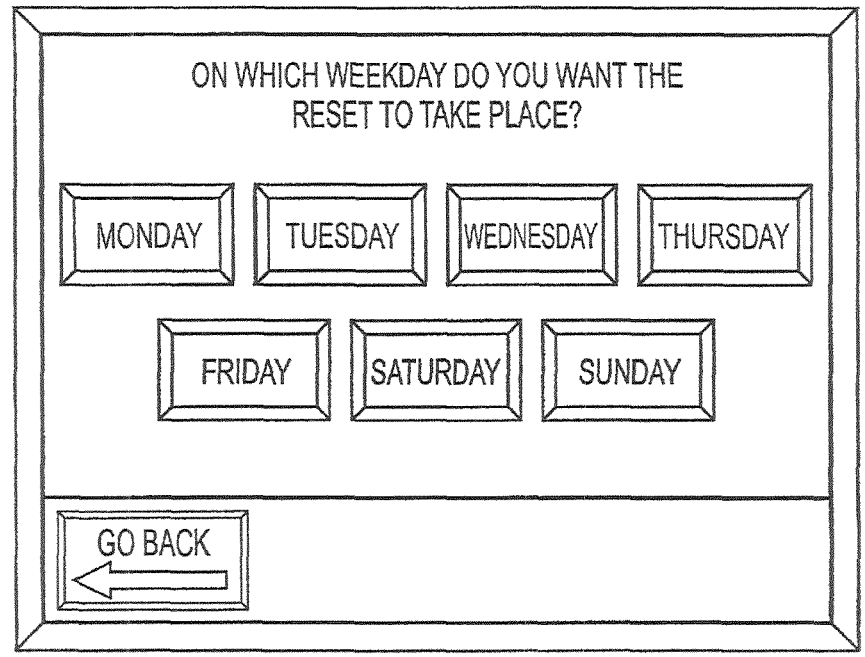
FIG. 9 shows an exemplary GUI editor screen for selecting a day of the week upon which the database is to be reset.
Figure 10:
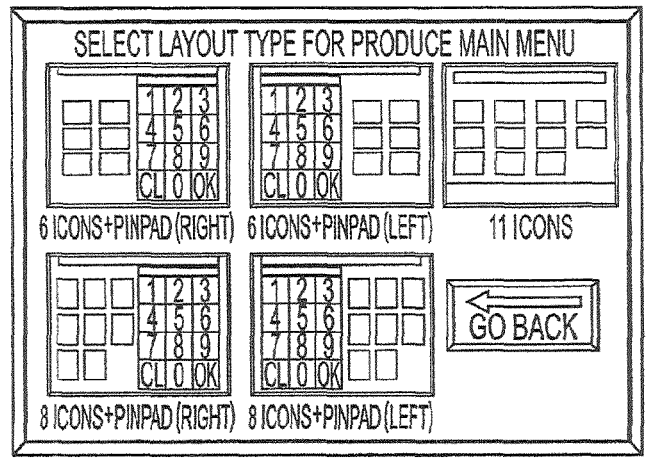
FIG. 10 shows an exemplary GUI editor screen for selecting visual layout of the GUI for non-bar coded items.

When the administrator selects the first option, the GUI editor prompts the administrator to select a frequency for resetting the database of the most frequently sold items (step 116), as shown for example in FIG. 8. The frequencies that may be selected include, for example, daily, weekly, bi-weekly, monthly, etc. After the administrator selects the update frequency, the GUI editor prompts the administrator to select a day of the week on which the database is to be reset (step 118), as shown for example in FIG. 9.

After the administrator completes configuration of the best-seller database, the GUI editor provides the administrator with the edit options again (FIG. 7). The administrator then may select the "Layout Modification" option. A number of possible visual layouts of the GUI for non-bar coded items are displayed by the GUI editor for selection (step 120), as shown for example in FIG. 10.

Figure 11:
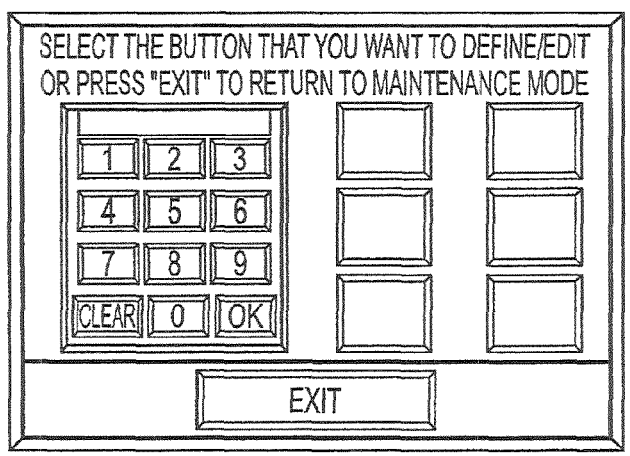
FIG. 11 shows an exemplary GUI editor screen for selecting a button to which an item or generic category may be assigned.

After one of the layouts is selected, the GUI editor prompts the administrator to select one of the buttons to be defined in the GUI for non-bar coded items (step 122), as shown for example in FIG. 11. Next, the GUI editor prompts the administrator to assign the selected button to an item or generic category (step 124). As shown for example in FIG. 12, the button may be assigned to one of the following item/category types: (i) a best seller; (ii) a specific produce item, e.g． kiwi; or (iii) a generic produce category, e.g., a family of fruits or vegetables.

For example, if "A Top 12 Best-seller Item" is selected (step 126), the selected button is assigned dynamically to the item that is currently highest in the list of most frequently sold produce items at the self-checkout terminals (step 128). After the button is assigned to the best seller item, the GUI editor prompts the administrator to select one of the remaining buttons, and the process is repeated for that second selected button.

Figure 12:
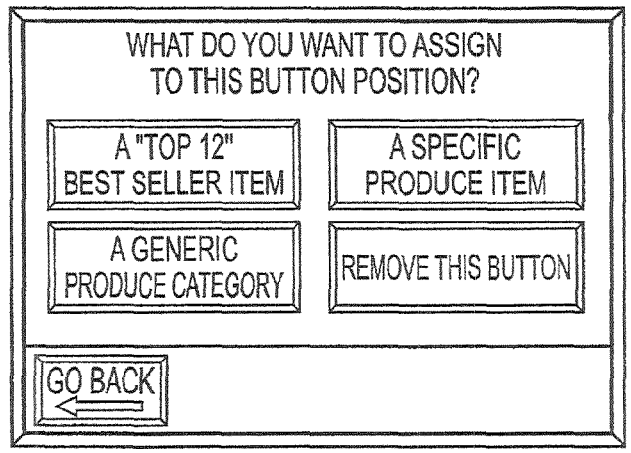
FIG. 12 shows an exemplary GUI editor screen for selecting a type of an item to be assigned to the selected button.
Figure 13:
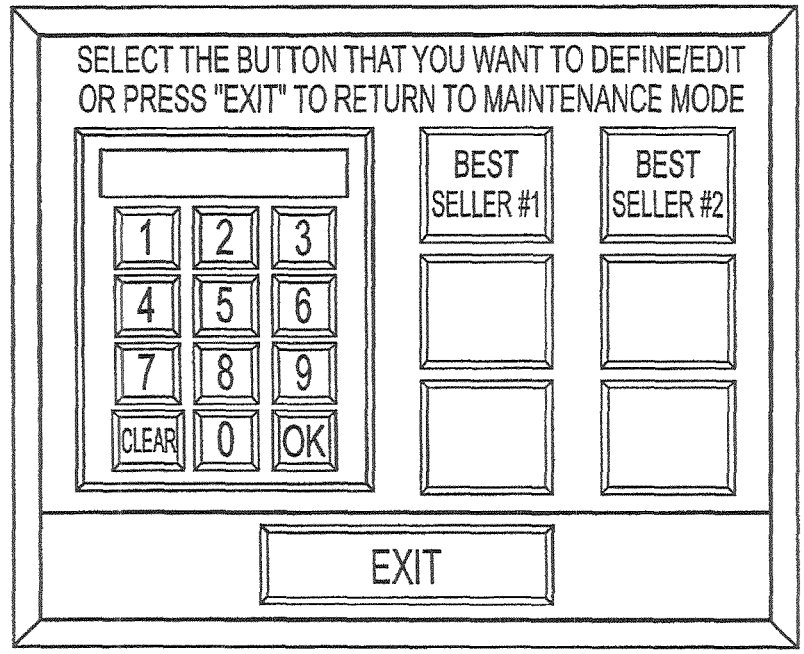
FIG. 13 shows an exemplary GUI editor screen for selecting a third button to be defined.
Figure 14:
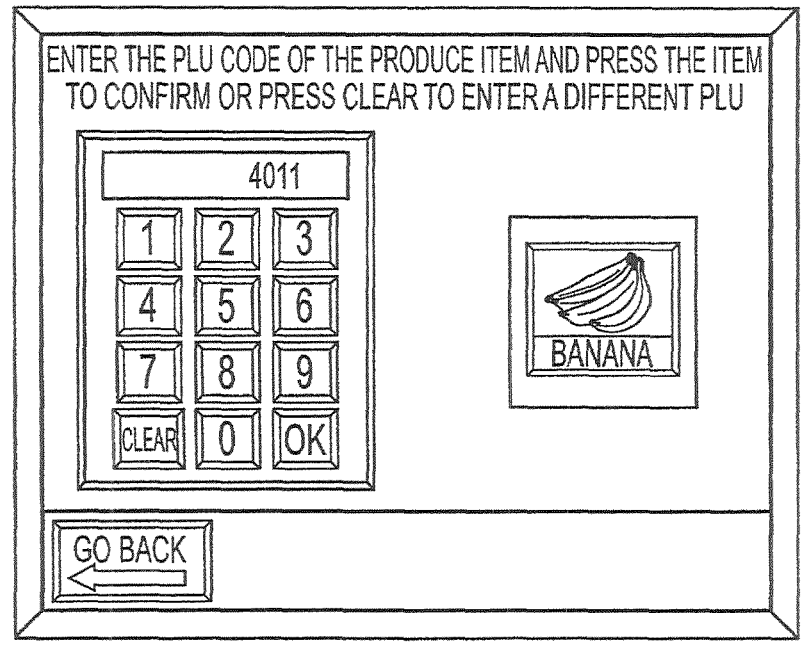
FIG. 14 shows an exemplary GUI editor screen for selecting a specific item to assign to a button.

FIG. 13 shows a GUI editor screen prompting the administrator to select another one of the buttons after the second button is assigned to, for example, the next best seller. After the third button is selected, the GUI editor prompts the administrator to assign the selected button to a produce item or generic category, as shown for example in FIG. 12.

For example, if "A Specific Produce Item" is selected (step 130), the administrator is prompted to enter a PLU code of the item to be assigned to the selected button (step 132). The image corresponding to the entered PLU code appears in a portion of the GUI editor screen, as shown for example by the image of the banana in FIG. 14.

Figure 15:
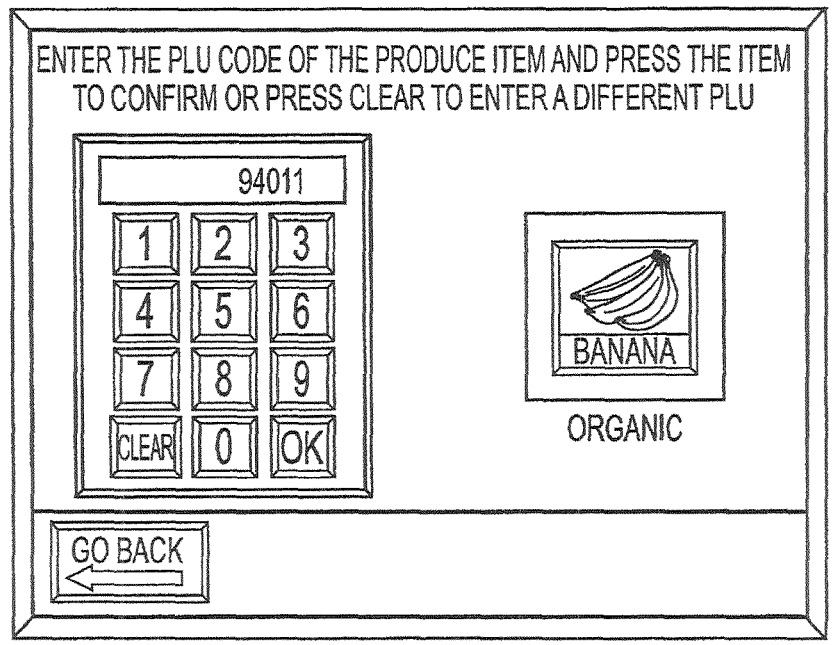
FIG. 15 shows an exemplary GUI editor screen indicating selection of an organic fruit/vegetable.
Figure 16:
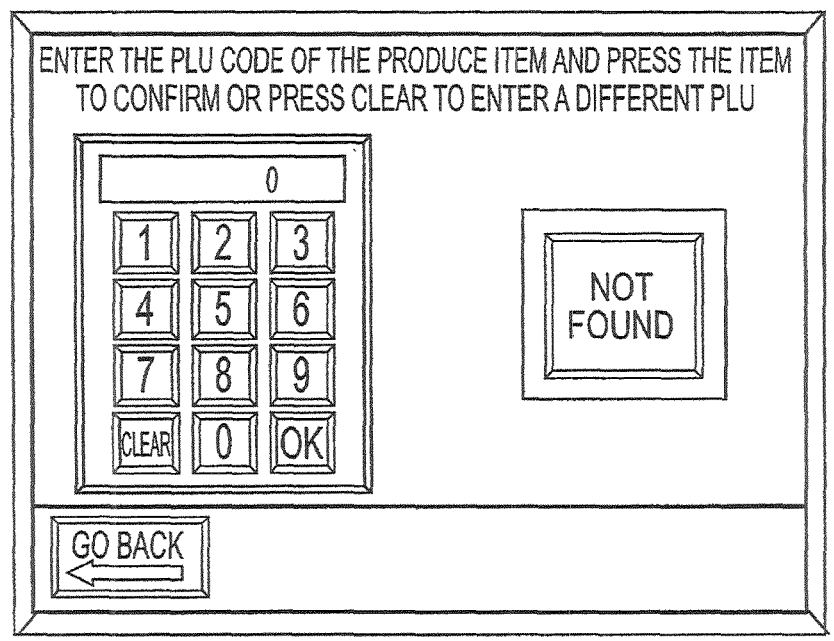
FIG. 16 shows an exemplary GUI editor screen informing that an incorrect PLU code was entered.

As shown for example in FIG. 15, an organic fruit or vegetables can be selected by specifying its corresponding PLU code.

The administrator may confirm that the image that appears in the GUI editor screen should be assigned to the button by pressing the displayed image (steps 134, 136 and 137). On the other hand, if the wrong code was entered (step 134), the administrator may select "CLEAR" to enter the PLU code again (step 138). If the PLU code entered by the administrator is not valid (step 135), the GUI editor displays a message that the image is not on file, as shown for example in FIG. 16, and disables the "OK" button. Under this circumstance, the GUI editor waits for the "CLEAR" key to be selected and a valid PLU code to be entered.

Figure 17:
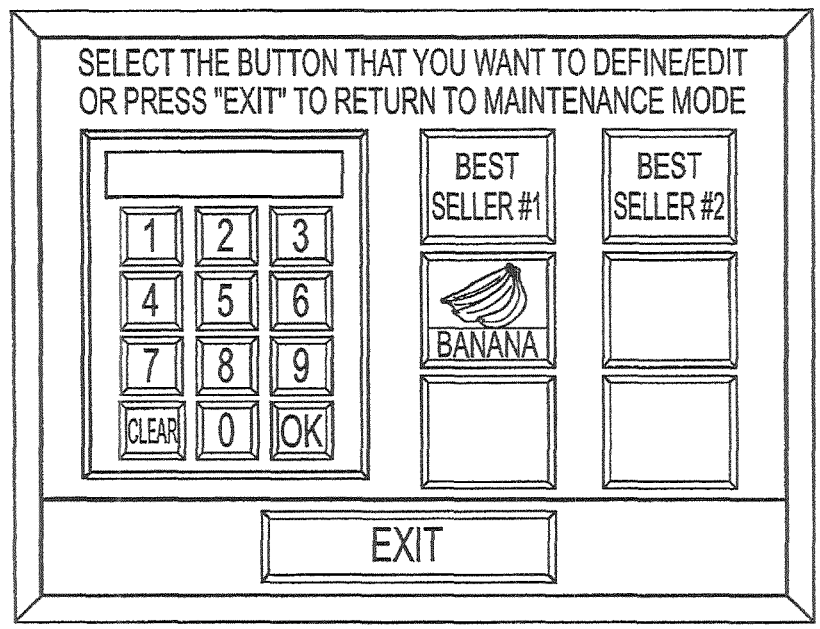
FIG. 17 shows an exemplary GUI editor screen for selecting a fourth button to be defined.
Figure 18:
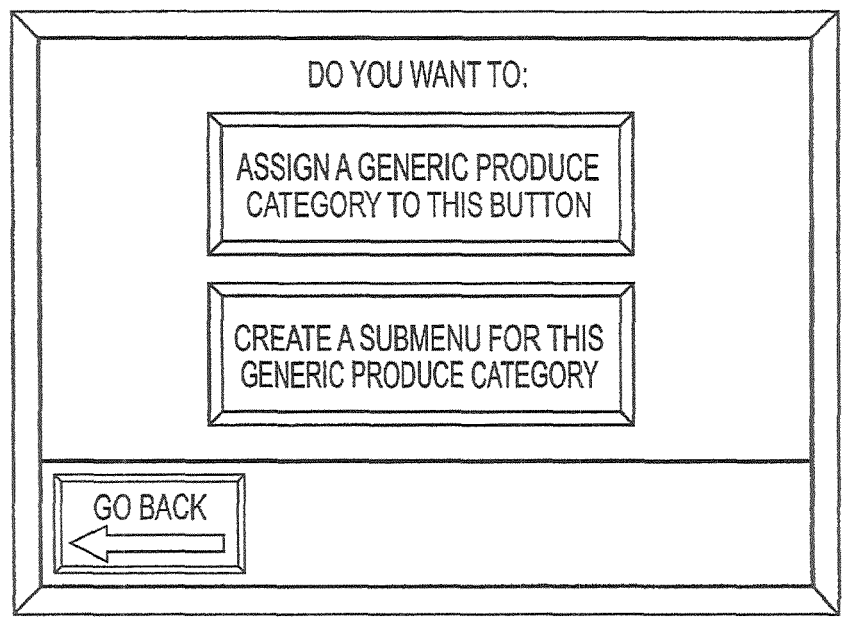
FIG. 18 shows an exemplary GUI editor screen for selecting a generic category to be assigned to a selected button.
Figure 19:
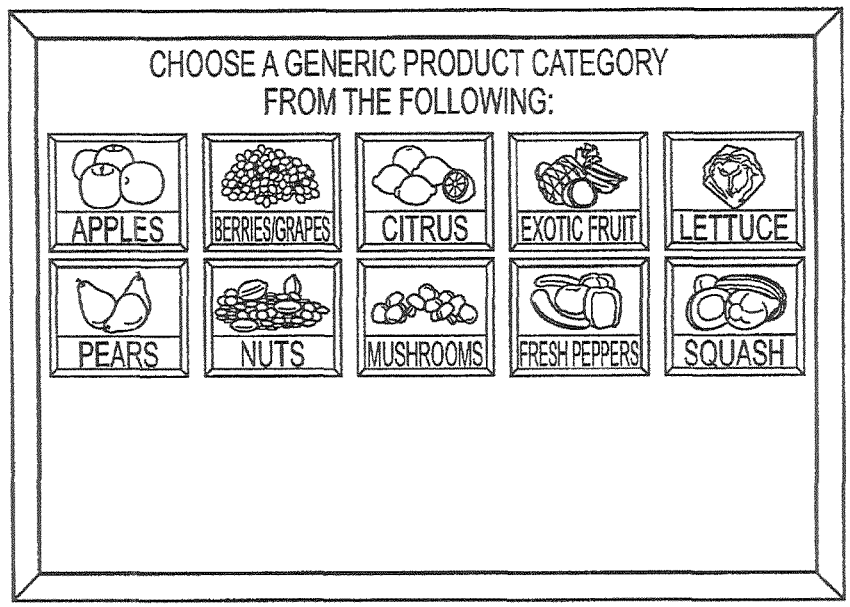
FIG. 19 shows an exemplary GUI editor screen for selecting a generic category.

Next, a fourth button to be defined may be selected from the main screen, as shown for example in FIG. 17. After a fourth button is selected, the screen for selecting an item or generic category, as shown for example in FIG. 12, again is presented by the GUI editor.

For example, "A Generic Produce Category" button may be selected (step 140). The generic category options include, as shown for example in FIG. 18, assigning a generic category to the selected button, or creating a submenu of other buttons to be linked to the category button. If the administrator chooses to assign the button to a generic category (step 141), the GUI editor prompts the administrator to select one of a number of generic categories (e.g., Apples) displayed on the screen (step 142), as shown for example in FIG. 19. When the administrator selects one of the generic categories, the selected button is set to the selected category (step 144)

Figure 20:
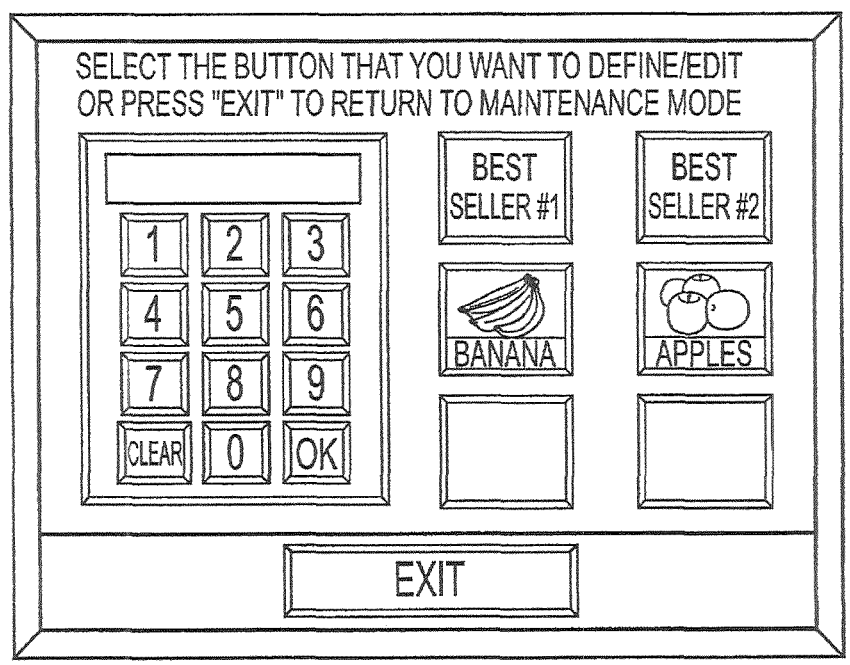
FIG. 20 shows an exemplary GUI editor screen for selecting a fifth button to be defined.
Figure 21:
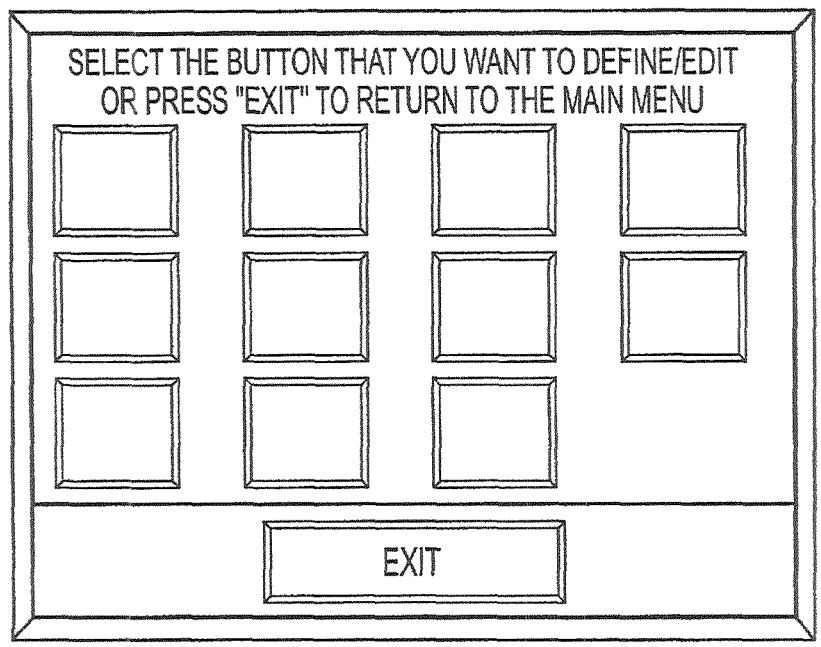
FIG. 21 shows an exemplary GUI editor screen for selecting a button to be assigned in the submenu.
Figure 22:
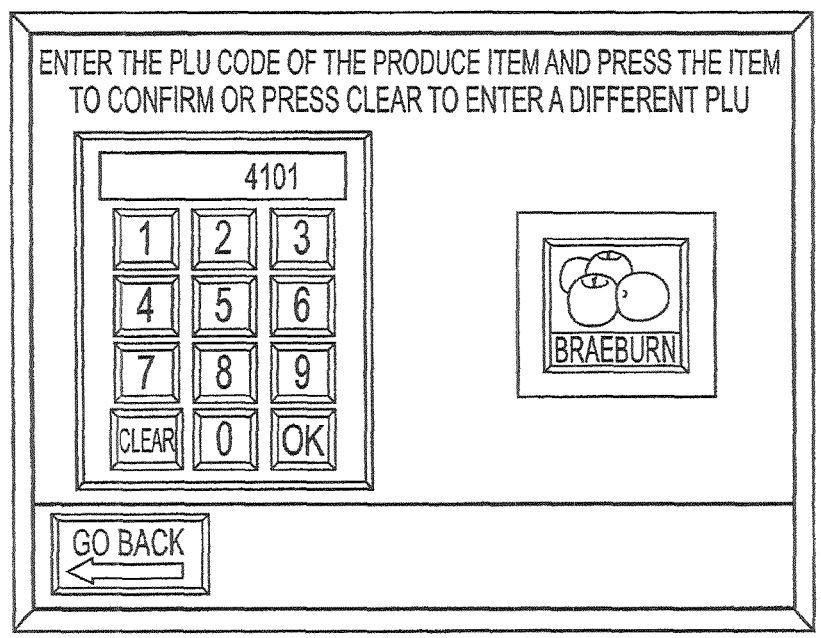
FIG. 22 shows an exemplary GUI editor screen for selecting an item to assign to the selected button in the submenu.

Next, the GUI editor prompts the administrator to select a fifth button to be defined, as shown for example in FIG. 20. After a fifth button is selected, the GUI editor prompts the administrator to select an item or generic category to the selected button, as shown for example in FIG. 12. For example, this button, like the previous, may be assigned to a generic category. Then, the GUI editor prompts the administrator to either (1) assign a generic category to the button or (ii) create a submenu of other buttons to be linked to the button, as shown for example in FIG. 18.

The option to create a submenu for this button may be selected, and then specific items may be assigned to buttons in the submenu. If the option to create a submenu is selected (step 141), the GUI editor prompts the administrator to select a button in the submenu (step 146), as shown for example in FIG. 21. Next, the GUI editor prompts the administrator to enter a PLU code of the item to be assigned to the selected button (step 148). When the PLU code is entered, the image corresponding to the entered PLU code appears in a portion of the GUI editor screen, as shown for example in FIG. 22. The administrator may confirm that the image that appears in the GUI editor screen should be assigned to the button in the submenu, by pressing the displayed image (step 150). The selected button in the submenu then is set to the selected item corresponding to the entered PLU code (step 151). If a mistake is made (step 149), the "CLEAR" button may be selected (step 152) and a correct PLU code entered (step 148).

Figure 23:
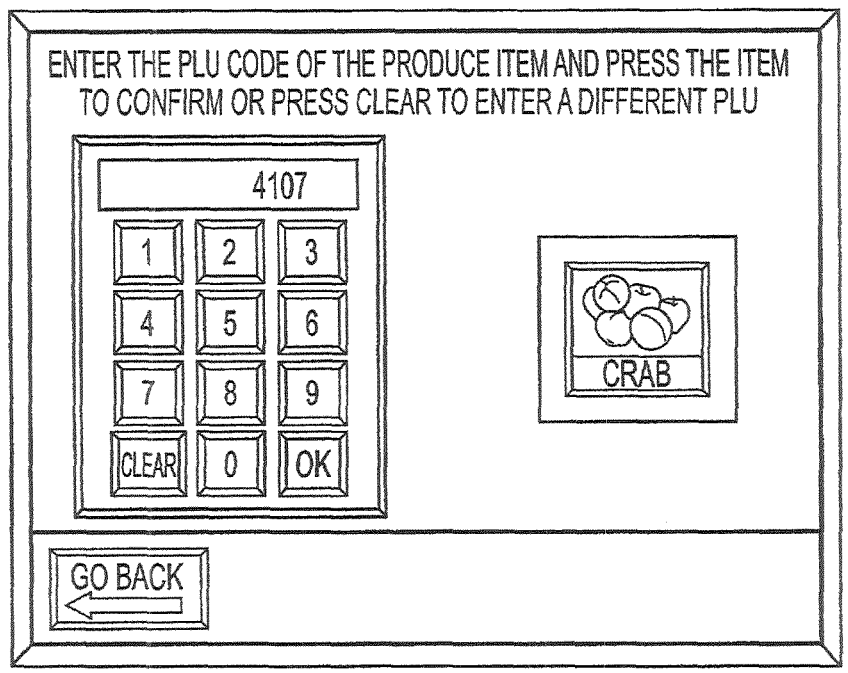
FIG. 23 shows an exemplary GUI editor screen for selecting an item to assign to a second button in the submenu.
Figure 24:
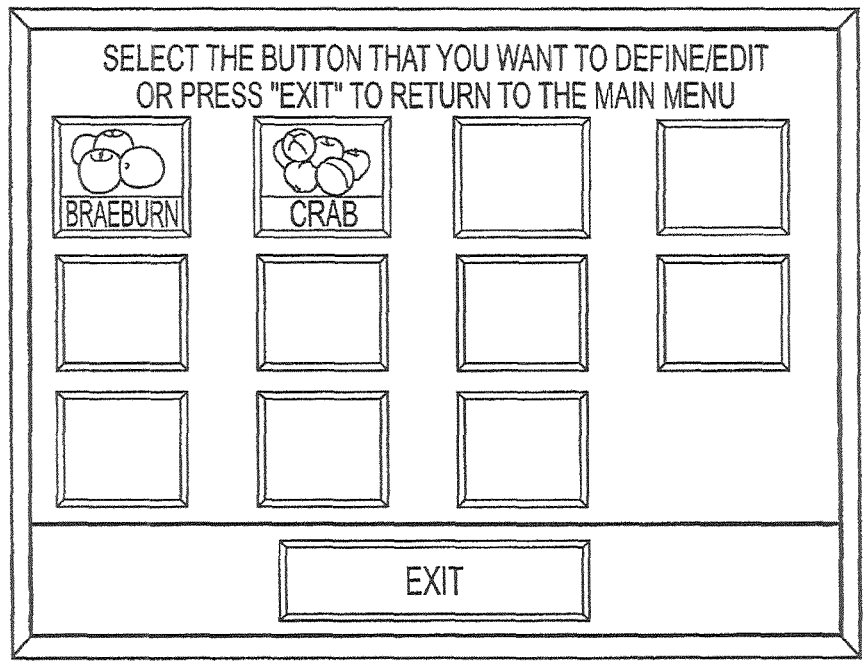
FIG. 24 shows an exemplary GUI editor screen for selecting a third button to be assigned in the submenu.
Figure 25:
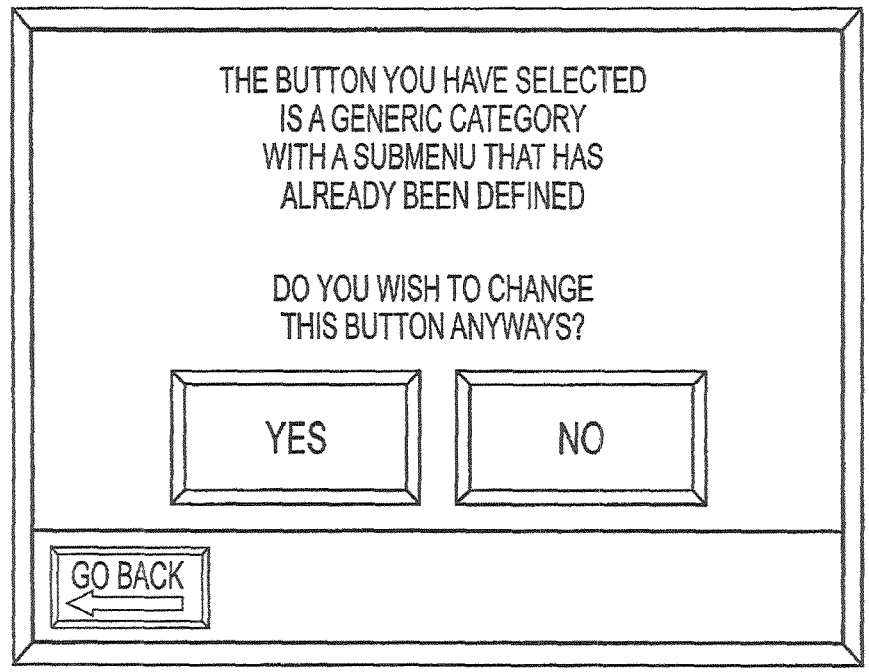
FIG. 25 shows an exemplary GUI editor screen for presenting a warning if a selected button has been assigned to a generic category with a pre-defined submenu.
Figure 26:
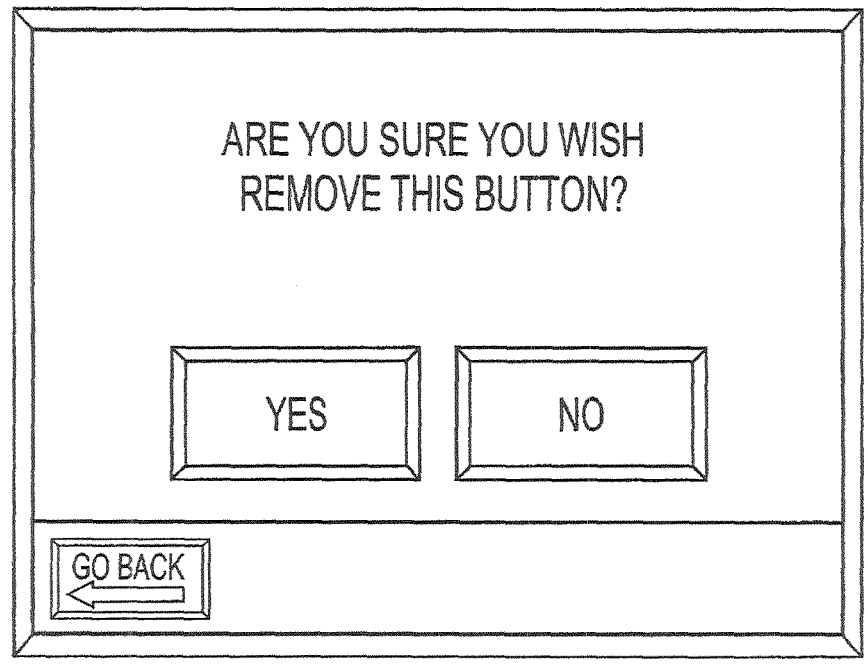
FIG. 26 shows an exemplary GUI editor screen for confirming removal of a selected button.

This process may be repeated, as shown for example in FIGS. 23 and 24, until all buttons in the submenu have been assigned to items. The "EXIT" button may be selected when the process is complete.

Let's now return to the GUI editor screen shown in FIG. 20. One of the already assigned buttons may be selected. After one of the assigned buttons (e.g., button assigned to the "Apples" category) is selected, the GUI editor screen shown in FIG. 12 is presented. If the administrator attempts to assign the button to another item or category, a warning screen, as shown for example in FIG. 25, appears. If the already assigned button corresponds to a generic category with a pre-defined submenu, all the information stored concerning the submenu could be lost if the "YES" button is selected.

Let's return again to the GUI editor screen shown in FIG. 20. After one of the assigned buttons is selected, the GUI editor screen shown in FIG. 12 again is presented. The administrator may choose to "Remove this Button" to delete the selected button. If the administrator chooses to "Remove this Button" a confirmation screen appears, as shown for example in FIG. 26. The "YES" button may be selected to confirm the deletion. The "Go Back" button may be selected to return to the edit options screen (i.e., FIG. 7), and then the "Go Back" button may be selected again to exit the GUI editor and return to the custom setup screen (i.e., FIG. 6), and a third time to return to the maintenance mode screen (i.e., FIG. 3).

Figure 27:
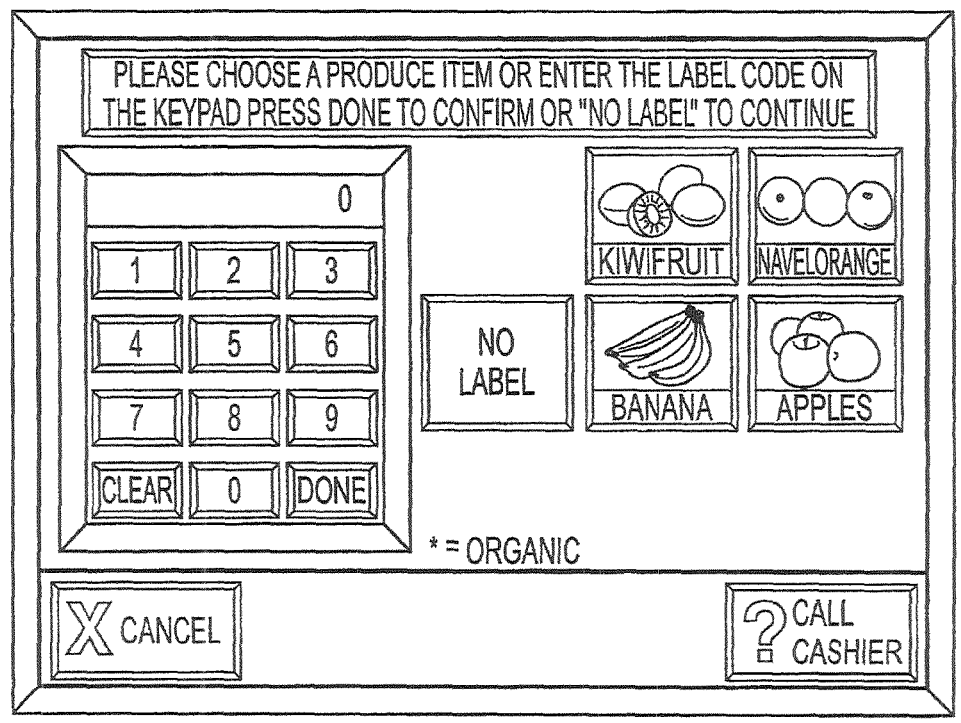
FIG. 27 shows an exemplary screen in the GUI for non-bar coded items.
Figure 28:
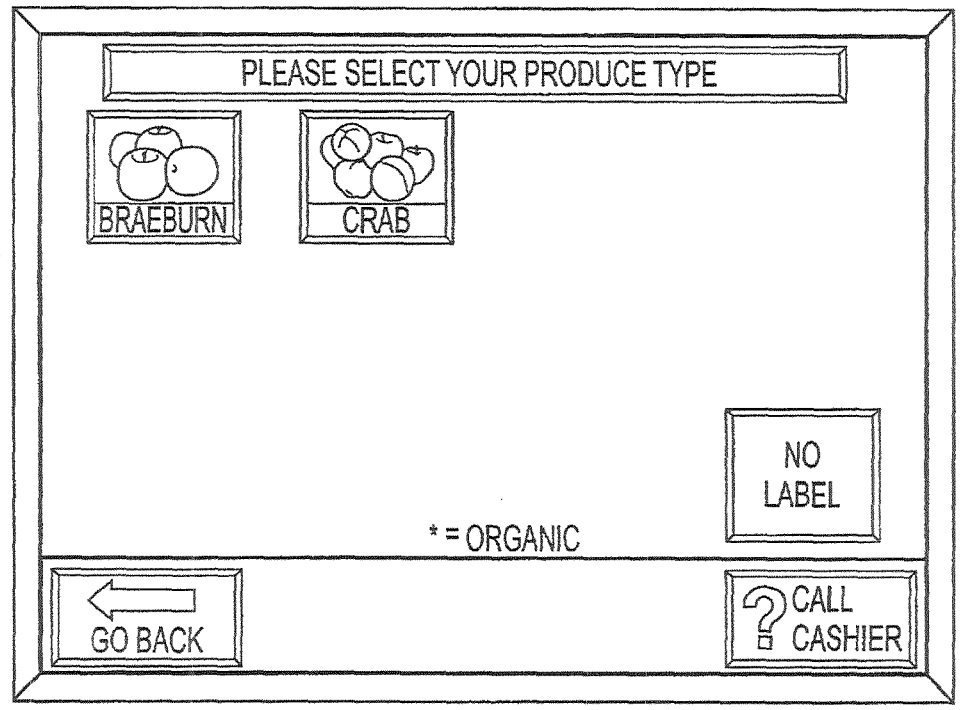
FIG. 28 shows an exemplary screen in the GUI for non-bar coded items when a generic category button is selected.
Figure 29A:
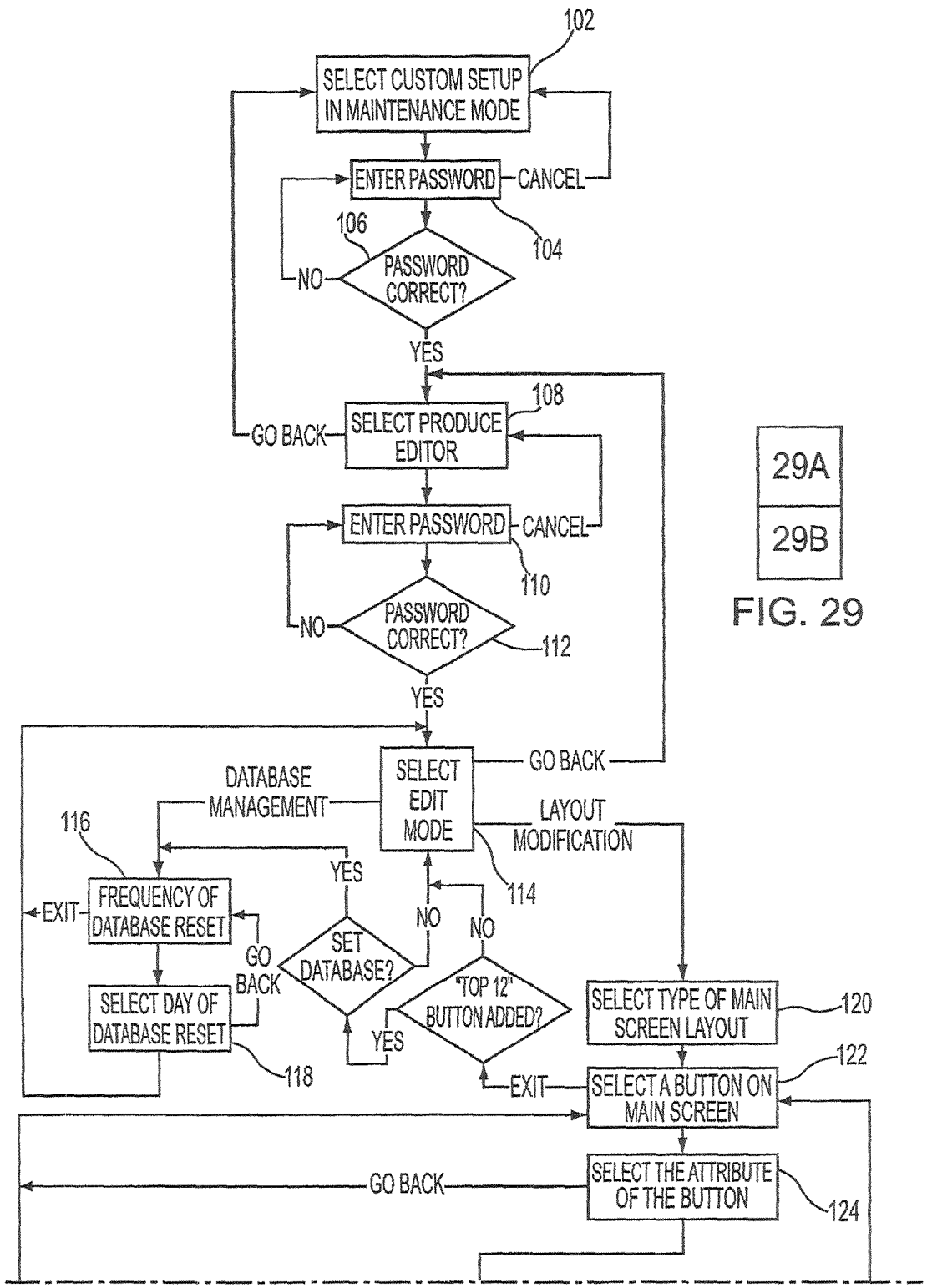
FIGS. 29A and 29B show a flow chart for a process, in accordance with an embodiment of the present invention, of setting up a non-bar coded items GUI.
Figure 29B:
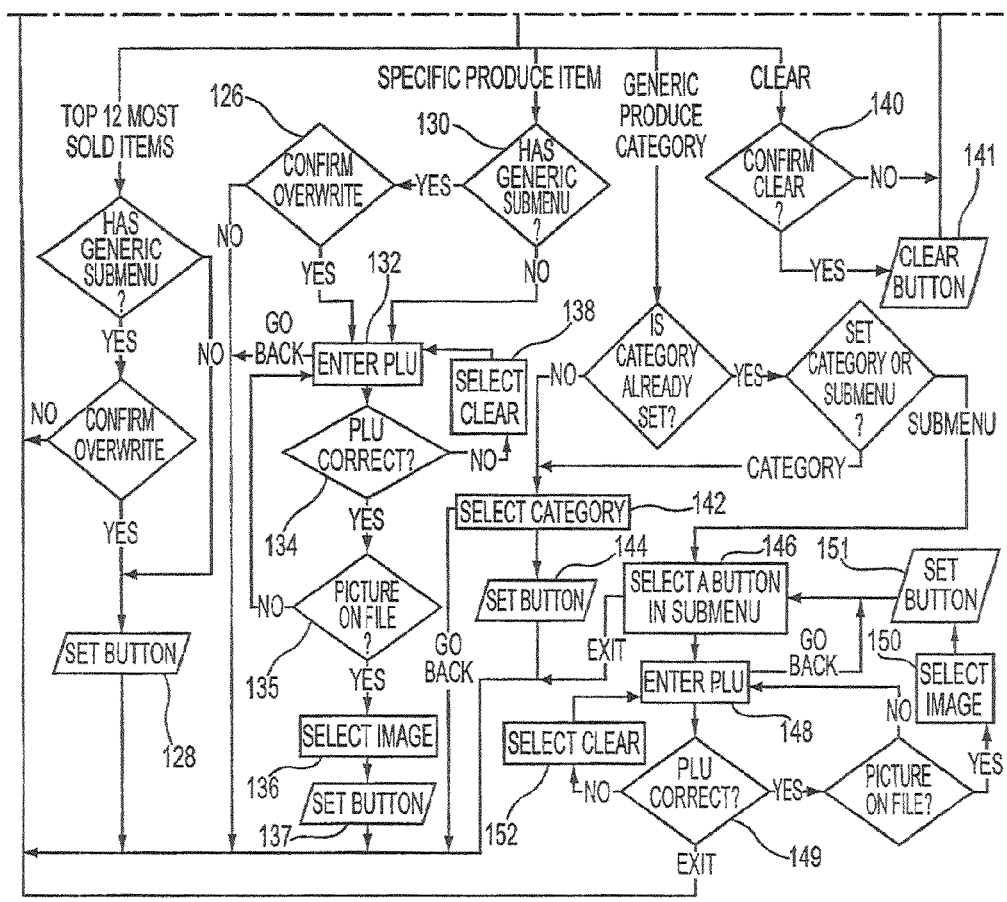

FIG. 27 illustrates how the GUI for non-bar coded items created by the editor process described above might look on the touch screen of a self-checkout terminal. After a customer selects the apples generic category button, the GUI screen shown in FIG. 28 is displayed.

Figure 37:
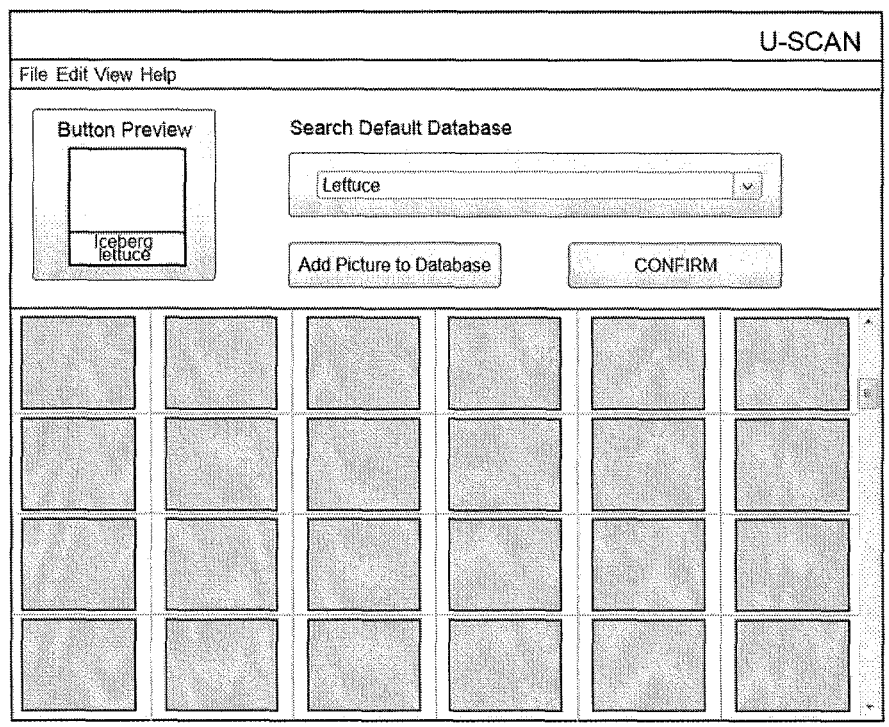
FIG. 37 shows an interface allowing a store manager to customize the items that may be selected by the user.

In some implementations, the system database may be customized on a per-store basis so that only items sold by the particular store are displayed to the consumer. FIG. 37 shows an interface allowing a store manager to customize the items that may be selected by the user. In the example of FIG. 37, the store manager has selected the default "lettuce" type database and may select particular varieties of lettuce in the system's database. If the standard database does not contain a particular product sold by a store, a new icon can be created by the system administrator (e.g., by importing a bitmap file or by capturing an image using the camera 306).

Various changes and modifications of the described embodiments could be effected by one skilled in the art without departing from the spirit or scope of the invention recited in the appended claims. For example, database 303 may be a local database dedicated to a particular checkout terminal or a remote database shared by terminals and other store systems, and may be a hard-disk or in-memory database or data structure, and although use for the checkout of supermarket produce items is described, the self-checkout system may be adapted for other retail environments such as the checkout of non-bar-coded hardware items in a hardware store. Improvements and modifications which become apparent to persons of ordinary skill in the art after reading this disclosure, the drawings and the appended claims are deemed within the spirit and scope of the present invention. It is therefore contemplated that the appended claims would cover any such modifications or improvements.

What is claimed is:

1. A product purchasing method at a point-of-sale self-checkout terminal comprising a code reader device for automated entry of a product identification code present on items for purchase and a customer input device for receipt of data from a customer, the product purchasing method comprising:
receiving from a self-checkout customer a first input at the customer input device initiating a purchase of an item non-scannable by the reader device;
querying a database to identify a first plurality of items based on a prediction of purchase of the items;
in response to the first input, displaying to the customer a graphical user interface comprising a first plurality of user-selectable icons each of said icons representing one of the first plurality of items;

receiving from the user a second input selecting one of the first plurality of icons; and processing a purchase transaction for an item corresponding to the selected icon.

2. The method of claim 1 wherein the self-checkout terminal further comprises a scale and wherein processing the purchase transaction comprises computing a purchase price based on weight measured by the scale.

3. The method of claim 1 wherein identifying the plurality of items based on a prediction of purchase comprises:

receiving customer identification data; based on the customer identification data, querying a database to retrieve purchase history information associated with the identified customer; and processing the purchase history information to determine the plurality of items.

4. The method of claim 3 wherein receiving the data identifying the customer comprises receiving data at an input device from a shopper identification card.

5. The method of claim 3 wherein the purchase history information comprises seasonal purchase information and querying the database comprises querying to retrieve purchase history information associated with the identified customer during a seasonal period.

6. The method of claim 1 wherein identifying the plurality of items based on a prediction of purchase comprises:

capturing an image of a checkout item;

processing the image using an image identification algorithm to compute a visual characteristics of the checkout item;

executing a matching algorithm to compare the visual characteristics of the checkout item to visual characteristic information stored in a database;

selecting the plurality of items based on the comparison of visual characteristics.

7. The method of claim 1 wherein identifying based on a prediction of purchase comprises querying a database to identify a plurality of frequently-purchased items.

8. The method of claim 1 wherein the interface is further configured to receive entry of an input identifying an item that is not represented by one of the first plurality of icons.

9. The method of claim 1 further comprising the prediction of purchase is based on correlation of items purchased by the customer during a purchasing session.

* * * * *